United States Patent
Zhao et al.

(10) Patent No.: US 9,756,359 B2
(45) Date of Patent: Sep. 5, 2017

(54) LARGE BLOCKS AND DEPTH MODELING MODES (DMM'S) IN 3D VIDEO CODING

(71) Applicant: QUALCOMM Incorporated, San Diego, CA (US)

(72) Inventors: Xin Zhao, San Diego, CA (US); Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 14/569,126

(22) Filed: Dec. 12, 2014

(65) Prior Publication Data
US 2015/0172717 A1 Jun. 18, 2015

Related U.S. Application Data

(60) Provisional application No. 61/916,780, filed on Dec. 16, 2013.

(51) Int. Cl.
*H04N 19/597* (2014.01)
*H04N 19/52* (2014.01)
*H04N 19/11* (2014.01)

(52) U.S. Cl.
CPC .......... *H04N 19/597* (2014.11); *H04N 19/11* (2014.11); *H04N 19/52* (2014.11)

(58) Field of Classification Search
CPC ....... H04N 19/597; H04N 19/11; H04N 19/52
USPC .................................................. 375/240.16
See application file for complete search history.

(56) References Cited

U.S. PATENT DOCUMENTS

| | | | |
|---|---|---|---|
| 2013/0022111 A1 | 1/2013 | Chen et al. | |
| 2014/0009574 A1* | 1/2014 | Hannuksela | H04N 19/00769 348/42 |
| 2014/0307786 A1* | 10/2014 | Deng | H04N 13/0007 375/240.12 |
| 2015/0003512 A1* | 1/2015 | Deng | H04N 19/187 375/240.02 |
| 2015/0049806 A1* | 2/2015 | Choi | H04N 19/597 375/240.12 |
| 2015/0103906 A1 | 4/2015 | Zhao et al. | |

(Continued)

FOREIGN PATENT DOCUMENTS

| | | | | |
|---|---|---|---|---|
| WO | WO 2013068566 A1 * | 5/2013 | ....... | H04N 19/00533 |
| WO | WO 2013157817 A1 * | 10/2013 | ........... | H04N 19/597 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Zhihan Zhou
(74) *Attorney, Agent, or Firm* — Shumaker & Sieffert, P.A.

(57) ABSTRACT

In some examples, a method of decoding depth data in a video coding process includes defining a depth prediction unit (PU) of a size greater than 32×32 within a depth coding unit (CU) and generating one or more partitions of the depth PU. The method also includes obtaining residual data for each of the partitions; obtaining prediction data for each of the partitions; and reconstructing each of the partitions based on the residual data and the prediction data for the respective partitions.

27 Claims, 10 Drawing Sheets

(56) References Cited

U.S. PATENT DOCUMENTS

2015/0365698 A1* 12/2015 Lin ..................... H04N 19/597
375/240.12

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2010, 674 pp.

International Search Report and Written Opinion—PCT/US2014/070400—ISA/EPO—dated Mar. 11, 2015, 10 pp.

Zhang et al., "3D-HEVC Test Model 5", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-E1005, XP030131385, Sep. 14, 2013, 50 pp.

Bossen et al, "HM Software Manual" for 3D-HEVC, Version 8.0, Joint Collaborative Team on 3D Video Coding Extension Development of ITU-T SG 16 WP 3 and ISO/IEC JTC 1/SC 29/WG 11, May 28, 2013, 18 pp.

Bossen et al, "Hm Software Manual" for 3D-HEVC, Version 9.0, Joint Collaborative Team on 3D Video Coding Extension Development of ITU-T SG 16 WP 3 and ISO/IEC JTC 1/SC 29/WG 11, May 28, 2013, 18 pp.

Tech et al., "3D-HEVC Draft Text 1," Joint Collaborative Team on 3D Video Coding Extension Development of ITU-T SG 16 WP 3 and ISO/IEC JTC 1/SC 29/WG 11, Jul. 27-Aug. 2, 2013, Document: JCT3V-E1001-v3, Sep. 11, 2013, 89 pp.

Liu et al., "CE5 related: Generic SDC for all Intra modes in 3D-HEVC," Joint Collaborative Team on 3D Video Coding Extensions of ITU-T SG 16 WP 3 and ISO/IEC JTC 1/SC 29/WG 11, Oct. 25-Nov. 1, 2013, Document: JCT3V-F0126, Oct. 18, 2013, 8 pp.

Liu et al., "Proposed text for JCT3V-F0126 based on 3D-HEVC Draft Text 1," Joint Collaborative Team on 3D Video Coding Extensions of ITU-T SG 16 WP 3 and ISO/IEC JTC 1/SC 29/WG 11, Oct. 25-Nov. 1, 2013, Document: JCT3V-F0126_proposed_text, Oct. 18, 2013, 12 pp.

Tech et al., "3D-HEVC Draft Text 2," Joint Collaborative Team on 3D Video Coding Extension Development of ITU-T SG 16 WP 3 and ISO/IEC JTC 1/SC 29/WG 11, Oct. 25-Nov. 1, 2013, Document: JCT3V-F1001-v1, Nov. 15, 2013, 98 pp.

Tech et al., "3D-HEVC Draft Text 6," Joint Collaborative Team on 3D Video Coding Extensions of ITU-T SG 16 WP 3 and ISO/IEC JTC 1/SC 29/WG 11, Oct. 18-24, 2014, Document: JCT3V-J1001-v3, Oct. 29, 2014, 112 pp.

Schwarz et al., "Description of 3D Video Coding Technology Proposal by Fraunhofer HHI (HEVC compatible configuration A)," MPEG Meeting ISO/IEC JTC1/SC29/WG11, Doc. MPEG11/M22570, Geneva, Switzerland, Nov. 2011, 48 pp.

Schwarz et al., "Description of 3D Video Technology Proposal by Fraunhofer HHI (HEVC compatible; configuration B)," MPEG Meeting ISO/IEC JTC1/SC29/WG11, Doc. MPEG11/M22571, Geneva, Switzerland, Nov. 2011, 46 pp.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Jul. 25-Aug. 2, 2013, Document: JCTVC-N1003_v1, Sep. 27, 2013, 311 pp.

International Preliminary Report on Patentability from International Application No. PCT/US2014/070400, dated Mar. 2, 2016, 8 pp.

Second Written Opinion of International Application No. PCT/US2014/070400, dated Nov. 25, 2015, 7 pp.

Response to Written Opinion dated Mar. 11, 2015, from International Application No. PCT/US2014/070400, dated Oct. 9, 2015, 5 pp.

Response to Second Written Opinion dated Nov. 25, 2015, from International Application No. PCT/US2014/070400, dated Nov. 14, 2016, 21 pp.

Zhang et al., "3D-HEVC Test Model 5," Joint Collaborative Team on 3D Video Coding Extension Development of ITU-T SG 16 WP 3 and ISO/IEC JTC 1/SC 29/WG 11, Jul. 27-Aug. 2, 2013, Document: JCT3V-E1005, Sep. 14, 2013, 57 pp.

U.S. Appl. No. 14/912,152, by Hongbin Liu et al., filed Sep. 26, 2014.

Zhao X., et al., "CE5 related: Wedgelet pattern extension from 4x4 block", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-F0134, XP030131560, Oct. 18, 2013 (Oct. 18, 2013), 5 pages.

* cited by examiner

Orientation: 2

Orientation: 5

Orientation: 1

Orientation: 4

Orientation: 0

Orientation: 3

LARGE BLOCKS AND DEPTH MODELING MODES (DMM'S) IN 3D VIDEO CODING

This application claims the benefit of U.S. Provisional Application No. 61/916,780, filed Dec. 16, 2013, the entire content of which is incorporated herein by reference.

TECHNICAL FIELD

This disclosure relates to video coding, and more particularly, to depth modeling modes (DMMs) for three-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Multiview coding may allow a decoder to select different views, or possibly render multiple views. In addition, some three-dimensional (3D) video techniques and standards that have been developed, or are under development, make use of multiview coding aspects. For example, in some 3D video coding processes, different views may be used to transmit left and right eye views to support 3D video. Other 3D video coding processes may use multiview-plus-depth coding. In a multiview-plus-depth coding process, such as a process defined by the 3D-HEVC extension to HEVC, a 3D video bitstream may contain multiple views that include not only texture view components, but also depth view components. For example, a given view may comprise a texture view component and a depth view component. The texture view and depth view components may be used to construct 3D video data.

SUMMARY

In general, techniques of this disclosure relate to coding a depth map of a 64×64 sample or larger-size coding unit (CU) using Depth Modeling Modes (DMMs). DMM techniques for intra coding depth maps may partition a depth block of a depth map into two or more regions specified by a particular DMM pattern. Each depth value in a particular partition may be intra-predicted based on an intra-prediction mode for the partition, which indicates a predictor in another depth coding unit (CU).

Applying DMM techniques to increasingly larger PU sizes may result in greater processing complexity and/or storage requirements when determining a particular DMM pattern to partition a depth block. Techniques of the disclosure may improve the coding performance of DMM techniques for intra coding depth maps, in some examples, by reducing such processing complexity and/or storage requirements. The techniques of this disclosure may be applied to video coding standards and extensions of such standards.

In one example, a method of decoding depth data in a video coding process includes defining a depth prediction unit (PU) of a size greater than 32×32 within a depth coding unit (CU); generating one or more partitions of the depth PU; obtaining residual data for each of the partitions; obtaining prediction data for each of the partitions; and reconstructing each of the partitions based on the residual data and the prediction data for the respective partitions.

In one example, a device for coding video data includes a video data memory that stores one or more partition patterns, wherein the device is configured to: define a depth prediction unit (PU) of a size greater than 32×32 within a depth coding unit (CU); generate one or more partitions of the depth PU; determine residual data for each of the partitions; determine prediction data for each of the partitions; and reconstruct each of the partitions based on the residual data and the prediction data for the respective partitions.

In one example, an apparatus for coding data, the apparatus includes: means for defining a depth prediction unit (PU) of a size greater than 32×32 within a depth coding unit (CU); means for generating one or more partitions of the depth PU; means for obtaining residual data for each of the partitions; means for generating prediction data for each of the partitions; and means for reconstructing each of the partitions based on the residual data and the prediction data for the respective partitions.

In one example, a computer program product comprising a computer-readable storage medium having stored thereon instructions that, when executed, cause a processor of a device for coding video data to: define a depth prediction unit (PU) of a size greater than 32×32 within a depth coding unit (CU); generate one or more partitions of the depth PU; determine residual data for each of the partitions; determine prediction data for each of the partitions; and reconstruct each of the partitions based on the residual data and the prediction data for the respective partitions.

The details of one or more examples of the disclosure are set forth in the accompanying drawings and the description below. Other features, objects, and advantages will be apparent from the description and drawings, and from the claims.

DETAILED DESCRIPTION

Figure 1:
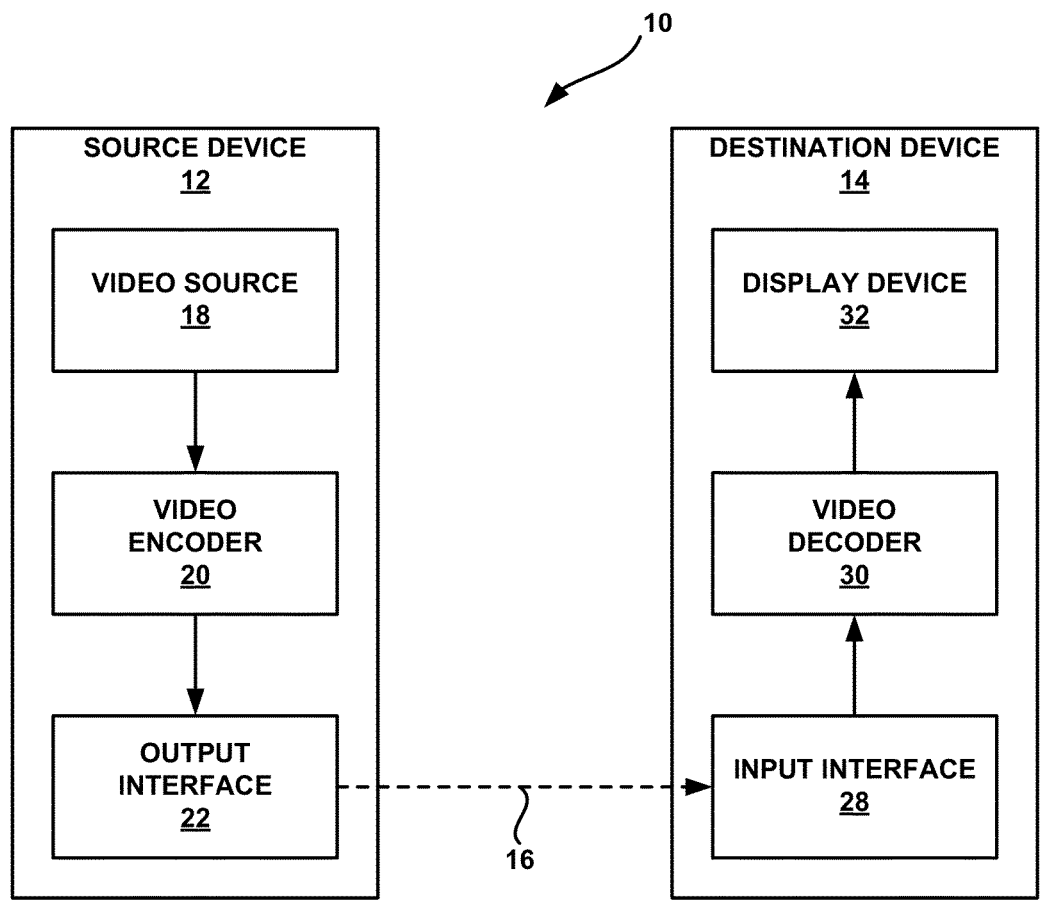
FIG. 1 is a block diagram illustrating an example video encoding and decoding system that may utilize the techniques of this disclosure for depth coding.

In three-dimensional (3D) video coding, such as in accordance with the 3D-HEVC (high efficiency video coding) standard, 3D video data is represented using a multiview video plus depth format, in which captured video data (also referred to as texture components of a texture view) are associated with corresponding depth maps of a depth view. For instance, a texture component, of the texture view, represents the video content, and a depth component, corresponding to the texture component, provides a depth map that represents the relative depth of the pixels in the texture component. A video encoder is configured to encode the texture components and depth maps and into a 3D video bitstream. A video decoder receives the 3D video bitstream and decodes the texture components and depth maps to reconstruct the 3D video data.

To leverage the video encoding capabilities of a video encoder and the decoding capabilities of a video decoder, the depth maps are formed as grayscale video where the luma samples represent the depth values. In this way, the depth values can be encoded and decoded using existing capabilities of the video encoder and the video decoder, instead of having to utilize some additional specialized encoding and decoding techniques for encoding and decoding the depth values.

For example, the video encoder may be configured to utilize inter-prediction encoding and/or intra-prediction encoding and the video decoder may be configured to utilize inter-prediction decoding and/or intra-prediction decoding for coding pictures of video. The video encoder and the video decoder may similarly respectively use inter-prediction and intra-prediction encoding and decoding techniques for coding the depth maps.

In some cases, the depth maps include sharp edges and constant areas, where a sharp edge occurs when there is a relatively large difference between the luma values on one side of the edge and the luma values on the other side of the edge. Due to such different statistics of depth map samples (e.g., luma values), there may be different coding schemes that are designed for depth maps based on a two-dimensional (2D) video codec. For instance, for two-dimensional video coding, there may not be depth maps. However, for 3D video coding that includes depth maps, additional video coding techniques may be useful for encoding and decoding depth maps.

For example, the 3D-HEVC standard extends concepts for 2D video coding, as defined in the HEVC standard, to 3D video coding. The 3D-HEVC standard uses the intra-prediction modes that are defined in the HEVC standard for intra-prediction encoding and decoding. Additionally, the 3D-HEVC standard makes use of depth modeling modes (DMMs) together with the HEVC intra-prediction modes to encode or decode an intra-prediction unit of a slice of a depth map (i.e., intra-predict a prediction unit (PU) of a depth slice).

In the DMMs, a depth block (or "depth PU") of a depth map may be partitioned into two or more regions, where each region is predicted by a constant value. The video encoder determines predictive values for each of the regions that the video decoder uses to intra-predict the block of the depth map. The video encoder may also signal the predictive values for each of the regions to the video decoder, or the video decoder may be configured to determine the predictive values without explicit signaling from the video encoder. In either case, the video decoder may utilize the predictive values to intra-predict the block of the depth map.

One of the ways in which to partition a block of a depth map (referred to as depth block) is referred to as Wedgelet partitioning. In Wedgelet partitioning, the video encoder determines a linear line that bisects the depth block thereby creating two regions. In this way. Wedgelet partitioning may be considered as line-based partitioning, and in some examples, form non-rectangular partitions (but it may be possible to form rectangular partitions). The linear line may start from a point on a side of the depth block and end at a point on an opposite side or orthogonal side of the depth block. As an example, in one orientation, the linear line may start from a point on a left side of the depth block and end at a point on a top side of the depth block. In another orientation, the linear line may start from a point on a top side of the depth block and end at a point on a bottom side of the depth block.

A Wedgelet pattern refers to one way in which a block of a depth map can be partitioned into two regions with a bisecting linear line, and the number of Wedgelet patterns that can exist for a block may be a function of the block size. For instance, for a given resolution (e.g., pixel, half-pixel, or quarter-pixel), for smaller sized blocks (e.g., 4×4 blocks defining a two-dimensional array of 4 pixels by 4 pixels), there are fewer points along the sides of the blocks as compared to larger sized block (e.g. 64×64 block defining a two-dimensional array of 64 pixels by 64 pixels). Therefore, there are fewer start and end points along each side of the smaller sized blocks as compared to larger sized blocks, resulting in fewer Wedgelet patterns.

In examples where one of the DMM modes is utilized, the video encoder may determine a Wedgelet pattern for the depth block, and intra-predict the Wedgelet pattern based on the determined Wedgelet pattern. The video encoder may determine a particular intra-prediction mode for a particular Wedgelet pattern. In some examples, the intra-prediction mode for each region defined by the Wedgelet pattern in a depth block may be the same mode. In some examples, each respective intra-prediction mode for each respective region defined by the Wedgelet pattern in a depth block may be a different intra-prediction mode. Because the video decoder may be configured to perform the inverse process to decode the block, the video decoder may determine the same Wedgelet pattern as the one that the video encoder determined. For instance, in some examples, the video encoder and the video decoder may each store a list of Wedgelet patterns. The video encoder may signal in the video bitstream an index into the list of Wedgelet patterns that identifies the determined Wedgelet pattern. The video decoder may then determine the same Wedgelet pattern as the video encoder based on the signaled index in the list of Wedgelet patterns. As another example, the video encoder may determine the Wedgelet pattern for a depth block from the video content characteristics of the corresponding texture block. The video decoder may be configured to implement the same techniques as the video encoder to determine the Wedgelet pattern so that the Wedgelet pattern the video decoder determines and the Wedgelet pattern the video encoder determines are the same Wedgelet pattern.

In the above examples for determining the Wedgelet pattern, the video encoder and the video decoder may be configured to store information for all of the Wedgelet patterns for all the block sizes. For block sizes of greater than 32×32, e.g., 64×64, the amount of computations and/or memory needed to store information for the Wedgelet partitions may be very large. In other words, memory and processing requirements for determining Wedgelet patterns for 64×64 and larger sized depth blocks may be significant. In 3D-HEVC, DMM modes with PU sizes up to 32×32 may be provided; however, such a limitation of the PU sizes to 32×32 in DMM modes may result in reduced coding efficiency, relative to 64×64 blocks. For DMM modes, the complexity might increase significantly for larger partition size, e.g., 64×64. Current 3D-HEVC supports DMM modes with PU sizes up to 32×32; however, such a limitation of the PU sizes in DMM modes might cause coding efficiency penalty.

This disclosure describes the use of the depth modeling modes (DMM) in 3D-HEVC for 64×64 and larger CUs. More specifically, it is proposed that the larger CU size can be applied to DMM modes. In accordance with techniques of this disclosure, a video coder (e.g., the video encoder or the video decoder) may determine Wedgelet patterns for depth blocks of size 64×64 and greater using techniques that, in some examples, reduce processing complexity and/or storage requirements. For instance, the video coder may select a Wedgelet partition pattern greater than 32×32 in size from a pre-defined Wedgelet pattern list for patterns greater than 32×32 in size on the current depth block, and signal an index into the list of pre-defined Wedgelet patterns greater than 32×32 in size that identifies the determined Wedgelet partition greater than 32×32 in size. In such examples, the video coder may generate the pre-defined Wedgelet pattern list for patterns greater than 32×32 in size by connecting all or some of the possible start and end point positions with a specified start/end point resolution of half-sample, full-sample, two samples, three samples or four samples.

In some examples, the Wedgelet partition pattern greater than 32×32 in size is generated as an upsampled N×N partition pattern, where N=4, 8, 16 or 32. For instance, N may be less than 64. N may be equal to 32 or less. A video encoder may determine a Wedgelet partition pattern for a 64×64 depth, but rather than signaling the 64×64 Wedgelet partition pattern, the video encoder may signal an N×N partition pattern having a shape and/or orientation that corresponds to the shape and/or orientation of the 64×64 Wedgelet partition pattern. Accordingly, a video decoder may upsample the N×N partition pattern when reconstructing the 64×64 depth block. In this way, the upsampling techniques may reduce the amount of storage space required for Wedgelet partition patterns by re-using an N×N partition pattern, e.g., where N is less than 64, rather than generating and storing a set of 64×64 Wedgelet partition patterns in addition to one or more N×N partition patterns.

In some examples, the number of partition patterns that a video coder requires to be stored for a depth block greater than 32×32 in size may be reduced if (i.e., based on) a partition pattern for the depth block is determined from a partition pattern associated with smaller sized blocks. In other words, the video encoder may generate the partition pattern greater than 32×32 in size by extending an N×N partition pattern at a given position, where N=4, 8, 16 or 32. In this way, because the video coder can use a particular number of partition patterns for determining the partition pattern for a block of N×N, the video coder may need to store less than X number of partition patterns for depth blocks of size greater than 32×32.

A video coder, in accordance with some example techniques of this disclosure, may select only from a reduced set of Wedgelet partition patterns. By selecting from only a reduced set of Wedgelet partition patterns, a video coder may reduce the amount of storage and/or computations required to determine the particular Wedgelet pattern for a depth block that will be signaled by the video coder. For instance, the video coder may select the Wedgelet partition greater than 32×32 in size from only the horizontal and vertical Wedgelet partition patterns greater than 32×32 in size, i.e., the start and end points have either the same horizontal coordinate or the same vertical coordinate.

In some examples, Simplified Depth Coding (SDC) Mode may be used when coding depth maps of a depth block greater than 32×32 in size. When using SDC, the video coder may signal just one respective DC residual value for each respective partition, where that DC residual value is used for reconstruction of all samples in the partition. By signaling only a single respective DC residual value for each respective partition, a video coder may reduce the amount of data that the video coder must send to reconstruct the depth block greater than 32×32 in size.

In some examples, the video coder may calculate an average value of all the samples in the texture block greater than 32×32 in size. The video coder may derive the partition pattern greater than 32×32 in size according to whether the samples in the co-located texture block greater than 32×32 in size are larger (partition 1) or not larger (partition 0) than the average value. In some examples, the video coder may assign samples equal to the average value to partition 1. In some examples, the video coder may assign samples equal to the average value to partition 0. In some examples, the video coder may determine whether to assign samples equal to the average value to partition 1 or partition 2 based on whether a threshold is satisfied. In some examples, the video coder may calculate the average value of all the samples in a downsampled N×N block of a co-located texture block greater than 32×32 in size and derive a partition pattern greater than 32×32 in size according to whether the samples in the N×N block are larger (partition 1) or not larger (partition 0) than the average value, where N can equals to 4, 8, 16 or 32. By using an average value, the video coder may require fewer computations to determine the predictive sample that is used to generate the residual value for each depth value in a depth partition. Various techniques for coding a depth map of a 64×64 or larger-size coding unit (CU) using Depth Modeling Modes (DMMs) are further described herein.

FIG. 1 is a block diagram illustrating an example video encoding and decoding system 10 that may utilize the techniques of this disclosure for depth coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, wearable computing devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multi-view coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques in accordance with this disclosure may be performed by any digital video encoding and/or decoding device. Although generally the techniques of this disclosure are performed by a video encoding device and a video decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX (multiplexing-demultiplexing) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

One example of a video coding standard includes the ITU-T H.264/MPEG-4 (AVC) standard, which was formulated by the ITU-T Video Coding Experts Group (VCEG) together with the ISO/IEC Moving Picture Experts Group (MPEG) as the product of a collective partnership known as the Joint Video Team (JVT). Another video coding standard includes the H.264 standard, including its Scalable Video Coding (SVC) and Multiview Video Coding (MVC) extensions. The H.264 standard is described in ITU-T Recommendation H.264, Advanced Video Coding for generic audiovisual services, by the ITU-T Study Group. The Joint Video Team (JVT) continues to work on extensions to H.264/MPEG-4 AVC. The latest joint draft of MVC is described in "Advanced video coding for generic audiovisual services," ITU-T Recommendation H.264, March 2010.

Video coding standards may also include ITU-T H.261, ISO/IEC MPEG-1 Visual. ITU-T H.262 or ISO/IEC MPEG-2 Visual, ITU-T H.263. ISO/IEC MPEG-4 Visual and ITU-T H.264 (also known as ISO/IEC MPEG-4 AVC), including its Scalable Video Coding (SVC) and Multiview Video Coding (MVC) extensions, as previously mentioned. The latest joint draft of MVC is described in "Advanced video coding for generic audiovisual services," ITU-T Recommendation H.264. March 2010. In addition, there is a new upcoming video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from: http://iphenix.int-evry.fr/jct/doc_end_user/documents/12_Geneva/wg11/JCTVC-L1003-v34.zip In some examples, video encoder 20 and video decoder 30 may operate according to a High Efficiency Video Coding (HEVC) standard and extensions of the HEVC standard, and may conform to the HEVC Test Model (HM). HEVC was developed by Join Collaborative Team on Video Coding (JCT-VC) of ITU-T Video Coding Experts Group (VCEG) and ISO/IEC Motion Picture Experts Group (MPEG). A recent draft of HEVC is available from http/i/phenix.int-evry.fr/jct/doc_end_user/documents/12_Geneva/wg11/JCTVC-L1003-v14.zip. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded (e.g., intra-prediction encoded), data for the PU may be included in a residual quadtree (RQT), which may include data describing an intra-prediction mode for a TU corresponding to the PU. As another example, when the PU is inter-mode encoded (e.g., inter-prediction encoded), the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 or RefPicList1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding (e.g., intra-prediction coding), a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector. e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30 may be configured to generally perform the reciprocal procedure to decode the video data and reconstruct the pictures that video encoder 20 utilized for encoding purposes. For example, video decoder 30 may receive the syntax elements and the video data from the signaled bitstream and perform reciprocal operations to intra-prediction decode and/or inter-prediction decode the video data to reconstruct the pictures.

Furthermore, for brevity, the techniques described in this disclosure may be described with respect to a video coder. Examples of the video coder include video encoder 20 when describing the encoding of video data, and video decoder 30 when describing the decoding of video data. This disclosure may also use the terms "code" or "coding." In this context, the term code may refer generically to encode or decode and the term coding may refer generically to encoding or decoding. For instance, a video coder may code, which means that video encoder 20 may encode or video decoder 30 may decode.

The above description provides example ways in which video encoder 20 and video decoder 30 may encode and decode video data based on the HEVC standard. In the techniques described in this disclosure, video encoder 20 and video decoder 30 may be configured for three-dimensional (3D) video encoding and decoding. For instance, video encoder 20 and video decoder 30 may be configured to perform 3D video encoding and decoding using developing video coding standards that leverage the HEVC video coding standard. However, the techniques described in this disclosure are not so limited and may be extended to other 3D video encoding and decoding techniques.

In JCT-3V, there are two HEVC extensions that are being developed, referred to as the multiview extension (MV-HEVC) and the 3D video extension (3D-HEVC). Reference software 3D-HTM (HTM) version 9.0 for 3D-HEVC can be downloaded from the following link: https://hevc.hhi.fraunhofer.de/svn/svn_3DVCSoftware/tags/HTM-9.0/ The latest working draft (document number: F1001) is available from: http://phenix.it-sudparis.eu/jct2/doc_end_user/documents/6_Geneva/wg11/JCT3V-F1001-v1.zip In 3D-HEVC, each access unit contains multiple pictures, and pictures in each view have a unique view id, or view order index. However depth pictures and texture pictures of the same view may have different layer ids. A draft of the 3D-HEVC standard is provided in the JCT3V-J1001 document, entitled "3D-HEVC Draft Text 6," (e.g., the "3D-HEVC Working Draft (WD)) by Gerhard Tech et al., which is also available, as of Oct. 24, 2014, from http/iphenix.it-sudparis.eu/jct2/doc_end_user/documents/10_Strasbourg/wg11/JCT3V-J1001-v3.zip.

In general, video data coded using 3D video coding techniques may be rendered and displayed to produce a three-dimensional effect. For example, two images of different views (e.g., corresponding to two camera perspectives having slightly different horizontal positions) may be displayed substantially simultaneously such that one image is seen by a viewer's left eye, and the other image is seen by the viewer's right eye.

This 3D effect may be achieved using, for example, stereoscopic displays or autostereoscopic displays. Stereoscopic displays may be used in conjunction with eyewear that filters the two images accordingly. For example, passive glasses may filter the images using polarized lenses or differently colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

In 3D video coding, there exists a plurality of views and each view includes a plurality of pictures referred to as texture pictures and depth pictures, or simply texture component and depth map. Each texture component may correspond to one depth map. The texture component may include the image content and the corresponding depth map indicates relative depth of the pixels in the texture. The texture components of different views that are to be displayed substantially simultaneously include similar image content, but there is horizontal disparity between objects in the textures of the different views. The texture and depth map are described in more detail below.

In 3D-HEVC, an access unit includes the texture pictures and their corresponding depth pictures that are to be displayed substantially simultaneously. The texture pictures and depth pictures in each view have a unique view identifier (view id) or view order index to identify to which view the pictures belong. However, a depth picture and texture picture of the same view may have different layer identifiers (layer ids).

The techniques of this disclosure relate to coding 3D video data by coding texture components and depth maps. In general, the term "texture" is used to describe luminance (brightness or "luma") values of an image and chrominance (color or "chroma") values of the image. In some examples, a texture image (i.e., texture picture) may include one set of luminance data and two sets of chrominance data for blue hues (Cb) and red hues (Cr). In certain chroma formats, such as 4:2:2 or 4:2:0, the chroma data is downsampled relative to the luma data. In other words, the spatial resolution of chrominance pixels may be lower than the spatial resolution of corresponding luminance pixels (e.g., one-half or one-quarter of the luminance resolution).

Depth data generally describes depth values for corresponding texture data. For example, a depth image (e.g., depth picture) may include a set of depth pixels that each describes depth for corresponding texture data of the corresponding texture picture. The depth data may be used to determine horizontal disparity for the corresponding texture data. Thus, a device that receives the texture and depth data may display a first texture picture for one view (e.g., a left eye view) and use the depth data to modify the first texture picture to generate a second texture picture for the other view (e.g., a right eye view) by offsetting pixel values of the first picture by the horizontal disparity values determined based on the depth values. In general, horizontal disparity (or simply "disparity") describes the horizontal spatial offset of a pixel in a left view relative to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change.

Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth picture (also referred to as a depth map). That is, a depth map corresponding to a texture picture describes depth data for the corresponding texture picture. Multiview video data may include data for various different views, where each view may include a respective sequence of texture pictures and corresponding depth pictures.

As noted above, pictures may correspond to a particular temporal instance. Video data may be represented using a sequence of access units, where each access unit includes all data corresponding to a particular temporal instance. Thus, for example, for multiview video data plus depth, texture pictures from each view for a common temporal instance, plus the depth maps for each of the texture pictures, may all be included within a particular access unit (AU). An access unit may include data for a texture component, corresponding to a texture picture, and a depth component, corresponding to a depth map.

In this manner, 3D video data may be represented using a multiview video plus depth (MV+D) format, in which captured or generated views (texture component) are associated with corresponding depth maps. Moreover, in 3D video coding, texture components and depth maps may be coded and multiplexed into a 3D video bitstream. Depth maps may be coded as grayscale images, where "luma" samples (that is, pixels) of the depth maps represent depth values, and conventional intra- and inter-coding methods can be applied for depth map coding. In general, a block of depth data (a block of samples of a depth map) may be referred to as a depth block. A depth value may refer to a luma value associated with a depth sample.

In any case, intra- and inter-coding methods (e.g., intra-prediction encoding and decoding and inter-prediction encoding and decoding techniques) may be applied for depth map coding. For instance, as described above, although the depth map indicates depth values for the corresponding texture picture, video encoder 20 and video decoder 30 may encode and decode the depth map using video coding techniques because the depth map is formed as a grayscale image, where the luma samples of the depth map indicate the depth value for the corresponding pixels in the corresponding texture picture.

Depth maps commonly include sharp edges and constant areas, and edges in depth maps typically present strong correlations with corresponding texture data of the corresponding texture picture. Due to the different statistics and correlations between texture and corresponding depth, different coding schemes have been and continue to be designed for depth maps based on a 2D video codec. For example, there may be additional video coding schemes that leverage the different statistics and correlations between texture and corresponding depth for video coding the depth maps than those available in the base HEVC standard.

Figure 2:
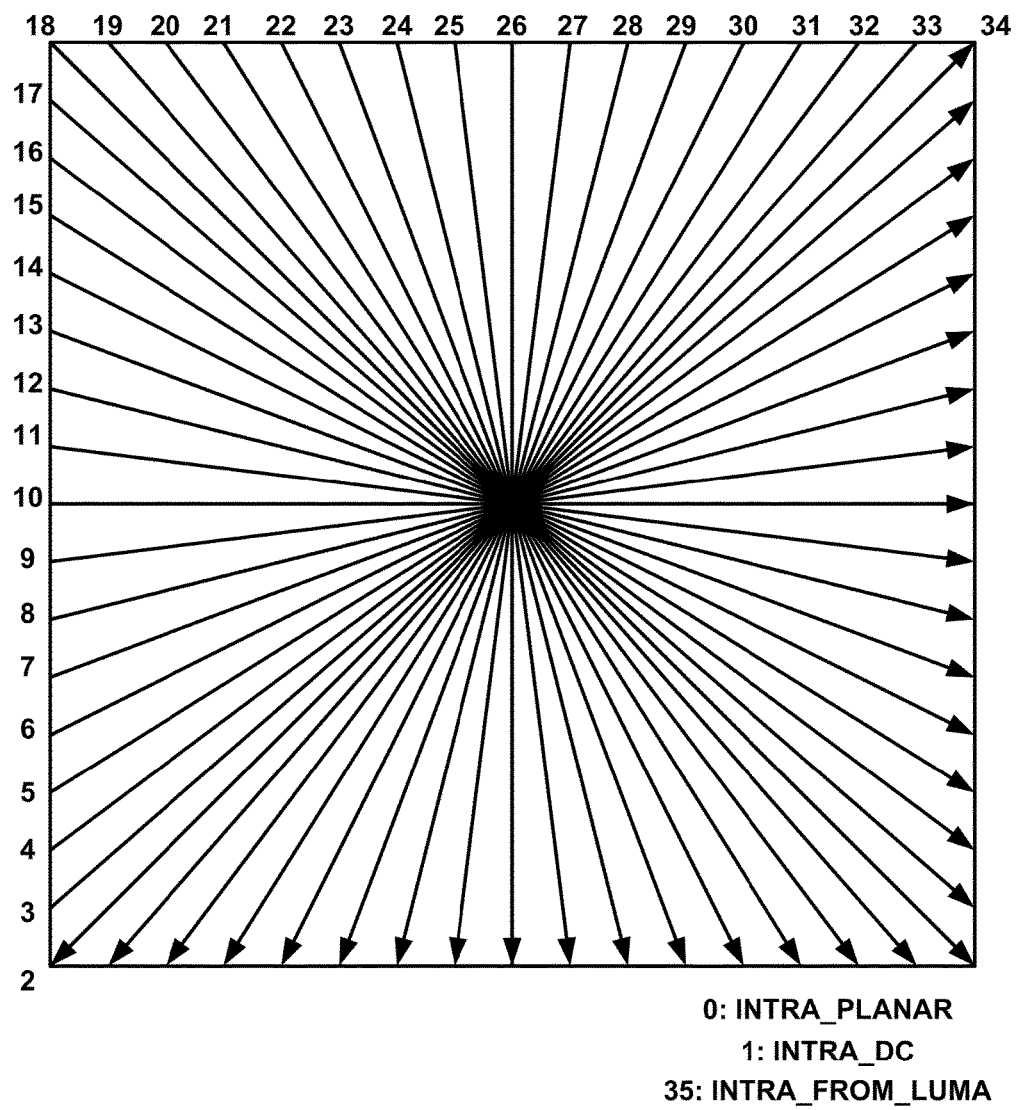
FIG. 2 generally illustrates the prediction directions associated with directional intra-prediction modes.

As one example, in the current HEVC standard, intra-prediction techniques for a luma component of each prediction unit (PU) may utilize 33 angular prediction modes (indexed from 2 to 34), a DC mode (indexed with 1), and Planar mode (indexed with 0). FIG. 2 generally illustrates the prediction directions associated with directional intra-prediction modes. In the current HEVC, for the luma component of each Prediction Unit (PU), an intra-prediction method is utilized with 33 angular prediction modes (indexed from 2 to 34), DC mode (indexed with 1) and Planar mode (indexed with 0), as shown in FIG. 2. With planar mode, prediction is performed using a so-called "plane" function. With DC mode (e.g., for producing a DC predicted value), prediction may be performed based on an averaging of pixel values within the block, or based on a single one of pixel values within the block. With a directional prediction mode, prediction is performed based on a neighboring block's reconstructed pixels along a particular direction (as indicated by the mode). In general, the tail end of the arrows shown in FIG. 2 represents a relative one of neighboring pixels from which a value is retrieved, while the head of the arrows represents the direction in which the retrieved value is propagated to form a predictive block.

The 3D-HEVC standard uses the same definition of the intra-prediction modes as those of the HEVC standard. In addition, 3D-HEVC introduced Depth Modeling Modes (DMMs) together with the HEVC intra-prediction modes to intra-prediction encode or decode a depth block (e.g., prediction unit) of a depth slice of a depth map. The DMMs may be better suited for representations of sharp edges in the depth maps for inter-prediction coding (encoding or decoding) of depth maps.

Some early versions of 3D-HEVC working drafts provide four DMM modes: Mode 1 (explicit Wedgelet signaling), Mode 2 (intra-predicted Wedgelet partitioning), Mode 3 (inter-component Wedgelet partitioning), and Mode 4 (inter-component Contour partitioning). In all four modes, a video coder, such as video encoder 20 or video decoder 30, may partition a depth block into two regions specified by a DMM pattern, where each region is represented by a constant value. The DMM pattern can be either explicitly signaled (mode 1), predicted by spatially neighboring blocks (mode 2), or predicted using a co-located texture block (mode 3 and mode 4).

Some versions of 3D-HEVC working drafts removed DMM mode 2, leaving DMM modes 1, 3, and 4. Some versions of 3D-HEVC working drafts also removed DMM mode 3, leaving DMM modes 1 and 4.

For better representations of sharp edges in depth maps, HTM may apply a DMM method for intra coding of depth map. There are new intra-prediction modes in DMM, and in these modes, video encoder 20 and video decoder 30 may be configured to partition a depth block into two regions specified by a DMM pattern (referred to as a partition pattern), where each region is represented by a constant value. For example, video encoder 20 may be configured to use different partition patterns (examples of the partition patterns are described above) to intra-predictively encode a depth block, and determine which partition pattern provided the most optimal coding (e.g., in terms of compression and video quality). Video encoder 20 may then intra-prediction encode the depth block using the determined partition pattern. Because video decoder 30 performs the reciprocal process as video encoder 20 to intra-predictively decode the depth block, video decoder 30 may be configured to determine the same partition pattern that video encoder 20 determined to intra-predictively decode the depth block.

Video encoder 20 may signal information indicating the depth modeling mode to video decoder 30, and video decoder 30 may determine the partition pattern from the signaled information indicating the depth modeling mode. For example, if video encoder 20 signals information indicating that the depth modeling mode is one (DMM mode 1), then video decoder 30 may be configured to parse the bitstream for information from video encoder 20 identifying the partition pattern for the depth block. In other words, if video encoder 20 determines that DMM mode 1 is to be used, video encoder 20 may explicitly signal information indicating that a DMM mode is used and signal information that video decoder 30 uses to identify the partition pattern for the depth block. In this way, the partition pattern (e.g., DMM pattern) that video encoder 20 and video decoder 30 use for intra-prediction coding the depth block is the same. In some examples, a partition pattern may be one of a plurality of partition patterns stored by video decoder 30. Each partition pattern may be associated with an identifier or index value that identifies the pattern. In some examples, video encoder 20 may signal a particular identifier or partition pattern index of a particular partition pattern that video coder 30 may use to identify the particular partition pattern.

For DMM mode 3 and 4, video encoder 20 may signal information indicating that the DMM mode is mode 3 or 4, but may not signal information identifying the partition pattern for the depth block. Rather, video decoder 30 may be configured to determine the partition pattern for the depth block from the co-located texture block in the corresponding texture picture. Video encoder 20 and video decoder 30 may each be configured to implement the same process for determining the partition pattern (e.g., DMM pattern) from the co-located texture block in the corresponding texture picture for DMM mode 3 and configured to implement the same process for determining the partition pattern (e.g., DMM pattern) from the co-located texture block in the corresponding texture picture for DMM mode 4.

Figure 3A:
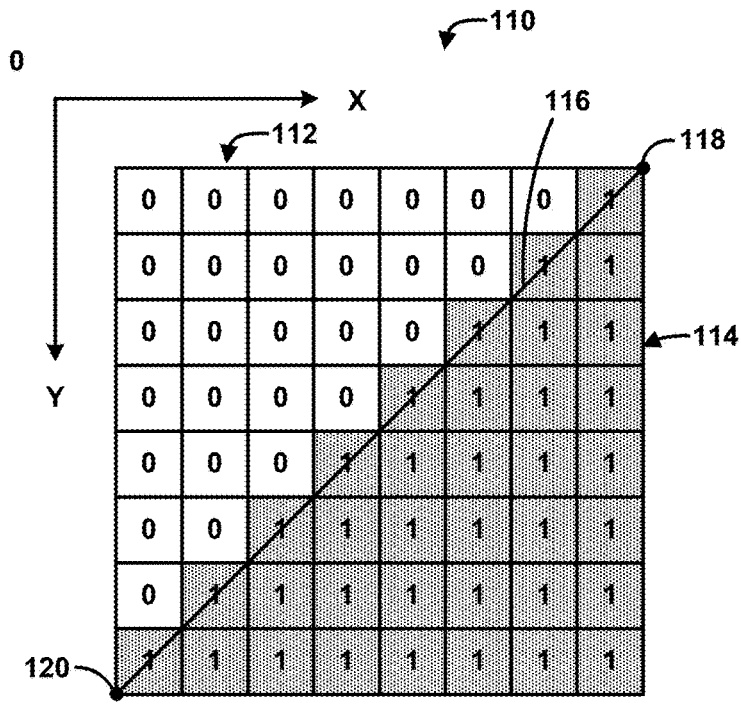
FIGS. 3A and 3B are conceptual diagrams illustrating examples of depth modeling modes (DMMs).
Figure 3B:
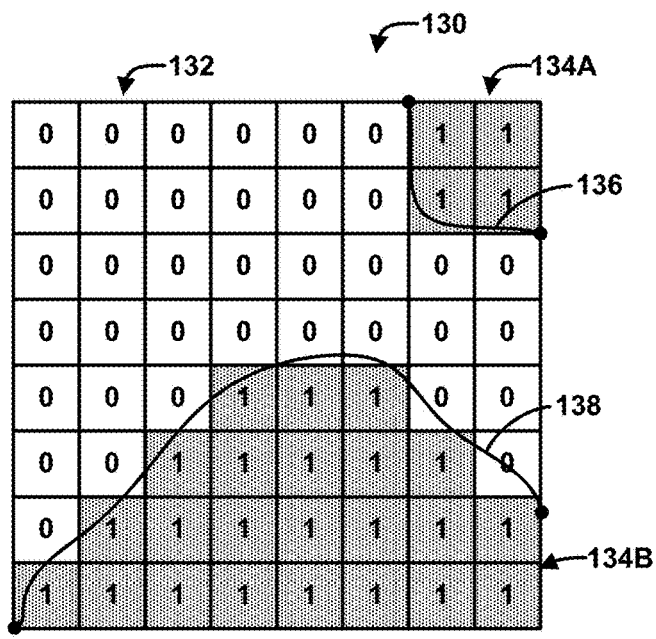

There are two types of partitioning mode defined in DMM, including Wedgelet partitioning and the Contour partitioning. FIGS. 3A and 3B are conceptual diagrams illustrating examples of depth modeling modes (DMMs). FIG. 3A illustrates one example of a Wedgelet pattern for an 8×8 block, and FIG. 3B illustrates on example of a Contour pattern for an 8×8 block.

FIG. 3A, for example, illustrates depth block 110 that is partitioned using Wedgelet partitioning, and FIG. 3B, as another example, illustrates depth block 130 that is partitioned using Contour partitioning. 3D-HEVC includes techniques for depth modeling modes (DMMs) for partitioning blocks along with the intra-prediction modes to code an intra-prediction unit of a depth slice. Thus, in 3D-HEVC, DMMs are introduced together with the HEVC intra prediction modes to code an Intra prediction unit of a depth slice. HTM version 3.1 applies a DMM method for intra coding of depth maps, which may better represent sharper edges in depth maps in some cases.

There are two types of partitioning models defined in DMM, including Wedgelet partitioning and the Contour partitioning. Again, FIG. 3A illustrates an example of Wedgelet partitioning, and FIG. 3B illustrates an example of Contour partitioning. Each individual square within depth blocks 110 and 130 represents a respective individual pixel of depth blocks 110 and 130, respectively. Numeric values within the squares represent whether the corresponding pixel belongs to region 112 (value "0" in the example of FIG. 3A) or region 114 (value "1" in the example of FIG. 3A). Shading is also used in FIG. 3A to indicate whether a pixel belongs to region 112 (white squares) or region 114 (grey shaded squares).

Each pattern (that is, both Wedgelet and Contour) may be defined by an array of size $u_B \times v_B$ binary digit which indicate whether the corresponding sample (that is, pixel) belongs to region $P_1$ or $P_2$ (where $P_1$ corresponds to region 112 in FIG. 3A and region 132 in FIG. 3B, and $P_2$ corresponds to region 114 in FIG. 3A and region 134A, 134B in FIG. 3B), where $u_B$ and $v_B$ represent the horizontal and vertical size of the current PU, respectively. In the examples of FIG. 3A and FIG. 3B, the PU corresponds to blocks 110 and 130, respectively. Video coders, such as video encoder 20 and video decoder 30, may initialize Wedgelet patterns at the beginning of coding (e.g., the beginning of encoding or the beginning of decoding).

As shown in the example of FIG. 3A, for a Wedgelet partition, depth block 110 is partitioned into two regions, region 112 and region 114, by straight line 116, with start point 118 (or "start location" 118) located at (xS, yS) and end point 120 (or "end location" 120) located at (xE, yE). In the example of FIG. 3A, start point 118 may be defined as point (8, 0) and end point 120 may be defined as point (0, 8).

As shown in the example of FIG. 3B, for Contour partitioning, a depth block, such as depth block 130, can be partitioned into two irregularly-shaped regions. In the example of FIG. 3B, depth block 130 is partitioned into region 132 and region 134A, 134B. Although pixels in region 134A are not immediately adjacent to pixels in region 134B, regions 134A and 134B are defined to form one single region, for the purposes of predicting a PU of depth block 130. The Contour partitioning may be more flexible than the Wedgelet partitioning, but may be relatively more difficult to signal. In DMM mode 4, in the case of 3D-HEVC, Contour partitioning pattern is implicitly derived using reconstructed luma samples of the co-located texture block.

In this manner, a video coder, such as video encoder 20 and video decoder 30, may use line 116, as defined by start point 118 and end point 120, to determine whether a pixel of depth block 110 belongs to region 112 (which may also be referred to as region "$P_1$") or to region 114 (which may also be referred to as region "$P_2$"). Likewise, a video coder may use lines 136, 138 of FIG. 3B to determine whether a pixel of depth block 130 belongs to region 132 (which may also be referred to as region "$P_2$") or to region 134 (which may also be referred to as region "$P_2$"). Regions "$P_1$" and "$P_2$" are default naming conventions for different regions partitioned according to DMM, and thus, region $P_1$ of depth block 110 should not be considered the same region as region $P_1$ of depth block 130.

As noted above, each of the DMMs may be defined by whether the DMM uses Wedgelet or Contour partitioning, and whether the pattern is explicitly signaled or implicitly determined. The DMM process may be integrated as an alternative to the intra prediction modes specified in HEVC (shown in FIG. 2). A one bit flag may be signaled for each PU to specify whether DMM or conventional intra prediction is applied.

An N×N partition pattern, as shown in FIGS. 3A and 3B, indicates an N×N binary block. In this disclosure, the value at position (i, j) of the N×N binary block is called the partition value of the partition pattern at position (i, j), where i, j=0, 1, . . . , N−1. For each position of an N×N partition pattern, the binary digit value indicates the partition (0 or 1) of the current position.

For instance, FIG. 3A illustrates one example of a Wedgelet pattern in which a linear line (e.g., straight line 116) bisects depth block 110. However, there may be many different Wedgelet patterns. For instance, rather than a linear line starting from (0, 8) and ending at (8, 0), as illustrated in FIG. 3A, in another example, a linear line starting from (1, 8) and ending at (8, 1) is possible. There may be many more such examples of Wedgelet patterns.

In general, the number of Wedgelet patterns may be a function of block size. For instance, larger sized depth blocks include more starting and end points than smaller sized depth blocks, meaning that there are more possible Wedgelet patterns for larger sized depth blocks than for smaller sized depth blocks.

In some examples, during initialization, a video coder (e.g., video encoder 20 and video decoder 30) may generate all available Wedgelet patterns, and construct a Wedgelet pattern list of the Wedgelet patterns. For this purpose, the Wedgelet patterns for all possible combinations of start and end point positions are generated, and a video coder stores in a lookup table the start and end point positions for each block size prior to the coding process. In examples where video encoder 20 identifies which Wedgelet pattern to use for intra-prediction of a depth block, video encoder 20 may signal an index into the lookup table of the Wedgelet patterns, where the index identifies the Wedgelet pattern that video encoder 20 used for intra-prediction encoding the depth block. Video decoder 30 receives the index into the lookup table of the Wedgelet patterns that video encoder 20 constructed during initialization. Video decoder 30 may then determine the Wedgelet pattern identified by the index, and use that Wedgelet pattern for intra-prediction decoding of the depth block. In this manner, video encoder 20 and video decoder 30 may utilize the same Wedgelet pattern for intra-prediction encoding and decoding, respectively.

The possible combinations of start and end point positions can be classified into six categories, depending on the orientation of the partition boundary line connecting start and end point positions. For example, a linear line that bisects the depth block may extend from the top row to left column, bottom row, or right column. A linear line that bisects the depth block may extend from the left column to the bottom row or right column (extending to the top row is already covered in the previous case). A linear line that bisects the depth block may extend from the bottom row to the right column (the others are already covered in the previous case). In this way, there are six categories for the linear line that bisects the depth block. These six categories are listed below in Table 1:

TABLE 1

| Orientation of partition boundary line connecting start and end points | | |
|---|---|---|
| Start point position | End point position | Orientation |
| Top row | Left column | 0 |
| Right column | Top row | 1 |
| Bottom row | Right column | 2 |
| Left column | Bottom row | 3 |

TABLE 1-continued

Orientation of partition boundary line
connecting start and end points

| Start point position | End point position | Orientation |
|---|---|---|
| Top row | Bottom row | 4 |
| Right column | Left column | 5 |

To generate an N×N Wedgelet partition pattern, given a start point (xS, yS) and an end point (xE, yE) position, video encoder 20 and video decoder 30 may first generate a temporary K×K partition pattern with all samples initialized as 0, where K equals 2N for half-sample (half pixel) accuracy, and K equals N for other cases. Video encoder 20 and video decoder 30 may set the samples which form the partition boundary line connecting (xS, yS) and (xE, yE) as 1, and divide the temporary partition pattern as two parts (e.g., part A and part B as illustrated in FIGS. 4A-4F).

FIGS. 4A-4F are conceptual diagrams illustrating examples of temporary partition patterns. For instance, FIGS. 4A-4F illustrate two parts divided by the partition boundary line (i.e., the linear line that bisects the depth block) in Wedgelet pattern generation. To generate an N×N Wedgelet partition pattern, given a start point (xS, yS) and an end point (xE, yE) position, video encoder 20 and video decoder 30 first generate a temporary K×K partition pattern with all samples initialized as 0, where K equals 2N for half-sample accuracy, and K equals N for other cases. Then, the samples which form the partition boundary line connecting (xS, yS) and (xE, yE) are set as 1, and the temporary partition pattern is divided as two parts, namely part A and part B as illustrated in FIGS. 4A-4F.

After video encoder 20 and video decoder 30 divide the temporary partition pattern as two parts, video encoder 20 and video decoder 30 select one of the two parts to be partition 1. Video encoder 20 and video decoder 30 may be configured to select which of the parts is partition 1 based on the orientation of the Wedgelet pattern boundary line. Because video encoder 20 and video decoder 30 are configured to select which of the parts is partition 1 in the same manner, video encoder 20 and video decoder 30 select the same part to be partition 1. Also, because the other partition (i.e., the partition that is not partition 1) is by default partition 0, video encoder 20 and video decoder 30 select the same part to be partition 0.

Figure 4C:
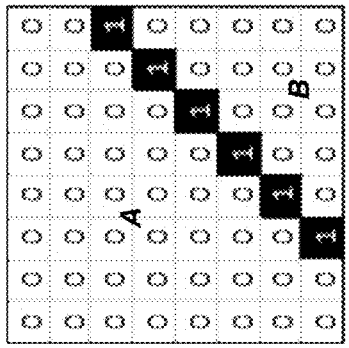
FIGS. 4A-4F are conceptual diagrams illustrating examples of partition patterns.
Figure 4F:
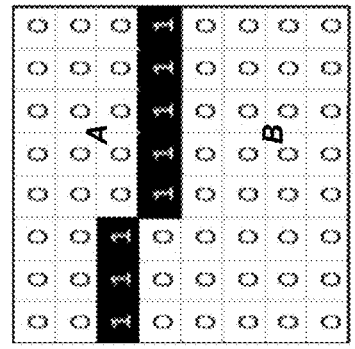
Figure 4B:
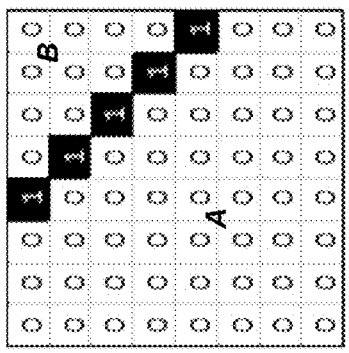
Figure 4E:
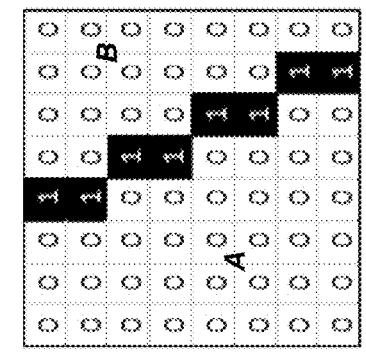

As described above, and indicated by Table 1, there may be six orientations of the linear line that bisects the depth block into two partitions for a Wedgelet pattern. FIGS. 4A-4F illustrate examples of such orientations. It should be understood that FIGS. 4A-4F each illustrate one example of respective orientations, and that there may other examples as well. For instance, FIG. 4B is for orientation 1, and Table 1 above indicates that orientation 1 is right column-to-top row. In FIG. 4B, the linear line starts from (8, 5) and ends at (4, 0). In another example of orientation 1, the linear line may start at (8, 7) and end at (1, 0).

Table 2, below, illustrates the manner in which video encoder 20 and video decoder 30 select which part is to be partition 1 based on the orientation of the partition boundary. For example, video encoder 20 and video decoder 30 may first determine the orientation of the partition boundary (i.e., the orientation of the linear line that bisects the depth block). Then, video encoder 20 and video decoder 30 may determine which partition of the two partitions created by the bisecting linear line should be identified as 1 and which partition should be identified as 0.

Figure 4A:
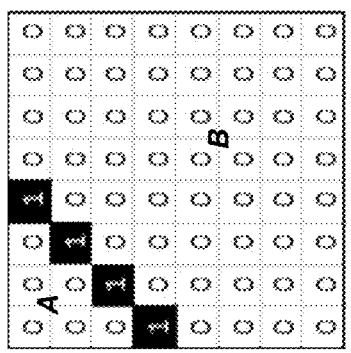
Figure 4D:
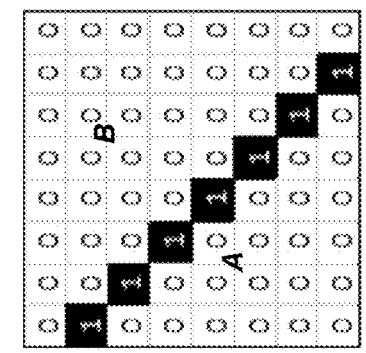

As one example, as indicated in Table 2, if the orientation partition boundary is 0, then video encoder 20 and video decoder 30 select the partition to be identified with a 1. FIG. 4A illustrates one example where the partition labeled A would be identified as 1, and the partition labeled B would be identified as 0. However, FIG. 4A is one example of orientation partition boundary 1, and there are other examples of orientation partition boundary 1. Video encoder 20 and video decoder 30 may perform similar functions for determining which partition is identified as 1 and which partition is identified as 0 for orientations 1-5 based on the criteria set forth in Table 2.

TABLE 2

Selection of samples for partition 1

| Orientation of partition boundary | Part of samples to be selected as 1 |
|---|---|
| 0 | A |
| 1 | B |
| 2 | B |
| 3 | A |
| 4 | xS + xE < K ? A: B |
| 5 | yS + yE < K ? A: B |

In the example illustrated in FIGS. 4A-4F, the linear line starts from a pixel (e.g., sample) within the depth block and ends at a pixel (e.g., sample) within the depth block. In such examples, the linear line may be considered as having full-sample accuracy. However, the techniques described in this disclosure are not so limited. For instance, the techniques may be extended to half-sample accuracy or even quarter-sample accuracy.

Figure 9A:
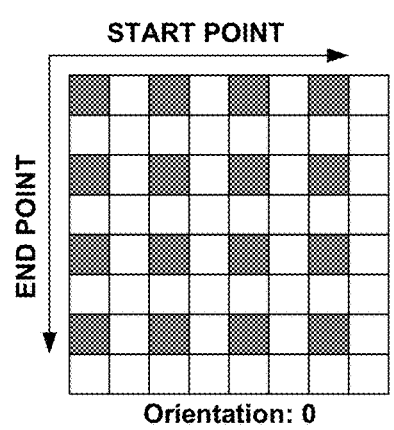
FIGS. 9A-9B are conceptual diagrams illustrating the generation and signaling of a Wedgelet partition pattern greater than 32×32 using a Wedgelet extension technique.
Figure 9B:
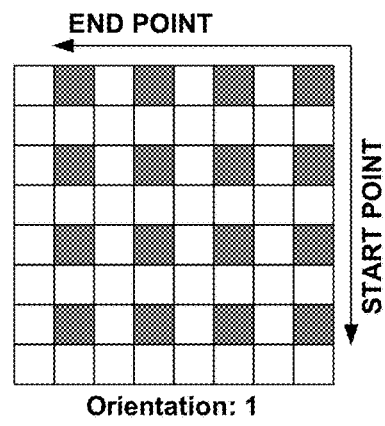

For the case of half-sample accuracy, video encoder 20 and video decoder 30 may generate the N×N partition pattern, again referred to as bPattern, as the downsampled version of the temporary K×K (K=2N) partition pattern bTempPattern. In this example, bPattern[i][j]=bTempPattern[m][n], where i, j=0, 1, . . . , N−1, and m, n=0, 1, . . . 2N−1. In this disclosure, the temporary K×K partition pattern is referred to as the corresponding Wedgelet pattern of this N×N partition pattern with start position (xS, yS) and end position (xE, yE), and this corresponding Wedgelet pattern is of size 2N×2N with start position (2*xS, 2*yS) and end position (2*xE, 2*yE). Because of the half-sample accuracy, 2*xS, 2*yS, 2*xE and 2*yE are integer numbers, but xS, yS, xE and yE may be fractional numbers. The mapping between (i, j) and (m, n) depends on the orientation of the partition boundary line. The techniques may be similarly extended for quarter-sample accuracy. FIGS. 9A-9B further describe examples of generating a partition pattern for the case of half-sample accuracy. For purposes of illustration, the examples are described for orientation 0 and orientation 1.

As described above, during initialization, video encoder 20 and video decoder 30 may each construct a Wedgelet pattern list that includes start and end points for all Wedgelet patterns (i.e., start and end points for different possible linear lines that bisect the depth block into two partitions for each orientation). In some cases, two Wedgelet patterns may be same. However, video encoder 20 and video decoder 30 may remove duplicate Wedgelet patterns during the Wedgelet pattern list initialization process such that the Wedgelet pattern list includes only unique patterns.

In generating the Wedgelet pattern list, the resolution for the start and end positions used for generating the Wedgelet patterns depends on the block size. For 32×32 blocks, the possible start and end positions are restricted to locations with an accuracy of 2 samples. For 16×16 blocks, full-sample accuracy is used, and for 4×4 and 8×8 blocks, half-sample accuracy is used. Accordingly, the number of possible Wedgelet patterns for different block sizes may be different. In general, the number of possible Wedgelet patterns is directly proportional to the size of the block (i.e., larger block sizes, more Wedgelet patterns, and smaller block sizes, fewer Wedgelet patterns).

During Wedgelet pattern list initialization process, to avoid adding duplicate Wedgelet patterns into the Wedgelet list, video encoder 20 and video decoder 30 may each add a newly generated Wedgelet pattern to the end of the Wedgelet list only when the newly generated Wedgelet pattern does not represent the same pattern with any of the current Wedgelet patterns in the list. When comparing two Wedgelet patterns of size N×N (i.e., PatternA[i][j], PatternB [i][j], where i, j=0, 1, . . . , N−1). PatternA is considered to be the same as PatternB if for all possible combinations of i and j in the range of [0, N−1], PatternA[i][j] is always equal to PatternB[i][j] or PatternA[i][j] is never equal to PatternB [i][j].

Due to the different block sizes and different accuracy of start and end point positions, different numbers and different patterns of Wedgelet patterns are available for different block sizes, as listed in below Table 3. For larger block sizes, the total number of Wedgelet patterns may be much larger, which may add to the storage requirement and complexity for pattern generation.

TABLE 3

Number of available Wedgelet patterns in DMM

| block size | Number of available Wedgelet patterns |
|---|---|
| 4 × 4 | 86 |
| 8 × 8 | 782 |
| 16 × 16 | 1394 |
| 32 × 32 | 1503 |
| 64 × 64 | 6079 |

A detailed process of Wedgelet list initialization has been specified in H.8.4.4.2.12, H.8.4.4.2.12.1 and H.8.4.4.2.12.2 of the working draft JCT3V-E1001. As noted above, the JCT3V-E1001 document is entitled "3D-HEVC Draft Text 1," by Sullivan et al., and is available, as of Oct. 13, 2014, from http://phenix.it-sudparis.eu/jct2/doc_end_user/current_ document.php?id=1361.

For HEVC intra prediction modes, video encoder 20 and video decoder 30 may generate a pixel specific predictive sample for each pixel in a PU by using neighboring samples of the PU. Such techniques are specified in sub-clause 8.4.2 in both HEVC and 3D-HEVC working drafts. For other depth intra modes, video encoder 20 and video decoder 30 calculate a partition specific DC predictor for each partition within the PU by using up to two neighboring samples of the PU.

To further illustrate calculating a partition specific DC predictor for each partition within the PU by using up to two neighboring samples of the PU, let bPattern[x][y] be a partition pattern of the PU, where x=0 . . . N−1, y=0 . . . N−1 and N is the width of the PU. bPattern[x][y] indicates which partition pixel (x, y) belongs to and bPattern[x][y] can be equal to 0 or 1. In the current example, let BitDepth be the bit depth of depth samples and let RecSample[x][y] be the reconstructed neighboring samples of the PU, with x=−1 and y=0 . . . N−1 (corresponds to left neighboring pixels of the PU) or y=−1, x=0 . . . N−1 (corresponds to above neighboring pixels of the PU), the DC predictor of partition X, namely DCPred[X], with X=0 or 1 is derived as follows:

Set bT=(bPattern[0][0] !=bPattern[N−1][0]) ?1:0
Set bL=(bPattern[0][0] !=bPattern[0][N−1]) ?1:0
If bT equals bL:
then
  DCPred[X]=(RecSample[−1][0]+RecSample[0][−1]) >>1
  DCPred[1−X]=bL ?(RecSample[−1][N−1]+RecSample[N−1][−1])>>1:$2^{BitDepth-1}$
else
  DCPred[X]=bL ?RecSample[(N−1)>>1][−1]: RecSample[−1][(N−1)>>1]
  DCPred[1−X]=bL ?RecSample[−1][N−1]: RecSample[N−1][−1]

The techniques described in this disclosure may also function in conjunction with simplified depth coding (SDC), but the techniques are not so limited and may function in examples where SDC is not utilized. The following describes simplified depth coding (SDC) mode. SDC mode is introduced together with the HEVC intra prediction modes, DMM modes and/or chain coding mode to code an intra PU of a depth slice. In the current 3D-HEVC, SDC is only applied for 2N×2N PU partition size. Instead of coding quantized transform coefficients, SDC modes represent a depth block with the following two types of information: (1) the type of partition of the current depth block, including DMM mode 1 (2 partitions) and Planar (1 partition), and (2) for each partition, a residual value (in the pixel domain) that is signaled in the bitstream.

Two sub-modes are defined in SDC including SDC mode 1 and SDC mode 2 which correspond to the partition types of Planar and DMM mode 1, respectively. Simplified residual coding is used in SDC. In simplified residual coding, one DC residual value is signaled for each partition of the PU, and no transform or quantization is applied.

To signal the residual value of each partition using SDC mode, a video coder could apply two methods. In a first method, the video coder may directly code the DC residual value of each partition which is calculated by subtracting the predictor, denoted by Pred, generated by neighboring samples from the DC value (i.e., average value, denoted by Aver) of the current partition in current PU. In some examples, Pred is generated by neighboring samples, and DC residual value is calculated from subtracting Pred from the DC value of the current partition in current PU. In a second method, when a video coder transmits depth lookup tables (DLT)s, instead of coding the DC residual value, the video coder codes the index difference of the Aver and Pred mapped from the Index Lookup Table. The video coder may calculate the index difference by subtracting the index of Pred from the index of Aver. At the decoder side, the video coder may map the sum of decoded index difference and the index of Pred back to depth values based on the DLT.

The techniques described in this disclosure may also function in conjunction with simplified inter-mode depth coding (SIDC), but the techniques are not so limited and may function in examples where SIDC is not utilized. In addition to the inter-view sample prediction and inter-view motion prediction similar to texture coding, 3D-HEVC may employ SIDC. SIDC extends SDC to inter mode depth coding. Therefore, it is named inter SDC for short in the following context. SIDC provides an alternative residual coding method and may only encode one DC residual value for a PU. The video coder may skip transform and quantization, and may not require any additional residual such as a transform tree. The video coder signals whether inter SDC is used in the general coding unit parameters at CU level. For inter SDC coded CU, the video coder may signal one DC residual value for each PU, and the DC residual is used as the residual for all samples in the PU for inter coding.

To decrease the signaling bits on inter SDC mode, in some examples, only non-skip CU is allowed to apply inter SDC. Furthermore, in some examples, to avoid possible overlap between inter SDC mode and skip mode, the video coder may apply inter SDC mode only when DC residual of each PU within the CU is non-zero. The video coder may calculate the DC residual of a PU as the average of the difference between the original sample value and prediction sample value of all samples with the PU. In some examples, because the video coder only signals the DC difference between the original block and prediction block, to compensate the AC difference, mean-removed motion estimation is employed for depth inter mode coding.

In JCT3V-F0126 "CE5 related: Generic SDC for all Intra modes in 3D-HEVC", which is available at: http://phenix.it-sudparis.eu/jct2/doc_end_user/current_document.php?id=1463, it is proposed that in depth coding, simplified residual coding can be applied for the additional depth intra prediction modes and the original HEVC intra prediction modes. Such a process is also described in U.S. provisional application No. 61/891,203, filed Oct. 15, 2013. In some examples, when using simplified residual coding, one DC residual value is signaled for each partition of the PU. For example, a PU coded with HEVC intra prediction modes has one partition, i.e., all pixels within the PU are in the same partition, and a PU coded with additional depth intra prediction modes has two partitions. In addition, both transform and quantization are skipped, and no additional residual is produced, i.e., the transform tree is not present in the 3D codec based on HEVC.

The following are syntax elements and associated semantics for indication of intra-inter SDC modes that may be generated and/or used by video encoder 20 and video decoder 30 in accordance with techniques of the disclosure.

Syntax

H.7.3.2.1.2 Video Parameter Set Extension 2 Syntax

|  | Descriptor |
|---|---|
| vps_extension2( ) { |  |
|   while( !byte_aligned( ) ) |  |
|     vps_extension_byte_alignment_reserved_one_bit | u(1) |
|   for( i = 0; i <= vps_max_layers_minus1; i++ ) { |  |
|     layerId = layer_id_in_nuh[ i ] |  |
|     if( layerId != 0 ) { |  |
|       iv_mv_pred_flag[ layerId ] | u(1) |
|       log2_sub_pb_size_minus2[ layerId ] | ue(v) |
|       if ( !VpsDepthFlag[ layerId ] ) { |  |
|         iv_res_pred_flag[ layerId ] | u(1) |
|         depth_refinement_flag[ layerId ] | u(1) |
|         view_synthesis_pred_flag[ layerId ] | u(1) |
|       } else { |  |
|         mpi_flag[ layerId ] | u(1) |
|         vps_depth_modes_flag[ layerId ] | u(1) |
|         lim_qt_pred_flag[ layerId ] | u(1) |
|         if( vps_depth_modes_flag[ layerId ] ) |  |
|           dlt_flag[ layerId ] | u(1) |
|         if( dlt_flag[ layerId ] ) { |  |
|           num_depth_values_in_dlt[ layerId ] | ue(v) |
|           for ( j = 0; j < num_depth_values_in_dlt[ layerId ] ; j++ ) { |  |
|             dlt_depth_value[ layerId ][ j ] | ue(v) |
|           } |  |
|         } |  |
|         vps_inter_sdc_flag[ layerId ] | u(1) |
|       } |  |
|     } |  |
|   } |  |
|   cp_precision | ue(v) |
| ... |  |

H.7.3.8.5 Coding Unit Syntax

| | Descriptor |
|---|---|
| coding_unit( x0, y0, log2CbSize , ctDepth) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) { | |
|     prediction_unit( x0, y0, nCbS, nCbS ) | |
|     if ( iv_res_pred_flag[ nuh_layer_id ] && RpRefPicAvailFlag ) | |
|       iv_res_pred_weight_idx | ae(v) |
|     if ( icEnableFlag ) | |
|       ic_flag | ae(v) |
|   } | |
|   else { | |
|     if( slice_type != I ) | |
|       pred_mode_flag | ae(v) |
|     if( ( CuPredMode[ x0 ][ y0 ] != MODE_INTRA || | |
|       log2CbSize = = MinCbLog2SizeY ) && !predPartModeFlag ) | |
|       part_mode | ae(v) |
|     if( CuPredMode[ x0 ][ y0 ] = = MODE_INTRA ) { | |
|       if( PartMode = = PART_2Nx2N && pcm_enabled_flag && | |
|         log2CbSize >= Log2MinIpcmCbSizeY && | |
|         log2CbSize <= Log2MaxIpcmCbSizeY ) | |
|         pcm_flag[ x0 ][ y0 ] | ae(v) |
|       if( pcm_flag[ x0 ][ y0 ] ) { | |
|         while( !byte_aligned( ) ) | |
|           pcm_alignment_zero_bit | f(1) |
|         pcm_sample( x0, y0, log2CbSize ) | |
|       } else { | |
|         pbOffset = ( PartMode = = PART_NxN ) ? ( nCbS / 2 ) : nCbS | |
|         for( j = 0; j < nCbS; j = j + pbOffset ) | |
|           for( i = 0; i < nCbS; i = i + pbOffset ) { | |
|             if( vps_depth_modes_flag[ nuh_layer_id ] ) | |
|               depth_mode_parameters( x0 + i , y0+ j , log2CbSize ) | |
|             if( DepthIntraMode[ x0 + i ][ y0 + j ] = = INTRA_DEP_NONE ) | |
|               prev_intra_luma_pred_flag[ x0 + i ][ y0 + j ] | ae(v) |
|           } | |
|         for( j = 0; j < nCbS; j = j + pbOffset ) | |
|           for( i = 0; i < nCbS; i = i + pbOffset ) | |
|             if( DepthIntraMode[ x0 + i ][ y0 + j ] = = INTRA_DEP_NONE) { | |
|               if( prev_intra_luma_pred_flag[ x0 + i ][ y0 + j ] ) | |
|                 mpm_idx[ x0 + i ][ y0 + j ] | ae(v) |
|               Else | |
|                 rem_intra_luma_pred_mode[ x0 + i ][ y0 + j ] | ae(v) |
|             } | |
|         intra_chroma_pred_mode[ x0 ][ y0 ] | ae(v) |
|       } | |
|     } else { | |
|       if( PartMode = = PART_2Nx2N ) { | |
|         prediction_unit( x0, y0, nCbS, nCbS ) | |
|         if( iv_res_pred_flag[ nuh_layer_id] && RpRefPicAvailFlag ) | |
|           iv_res_pred_weight_idx | ae(v) |
|       } else if( PartMode = = PART_2NxN ) { | |
|         prediction_unit( x0, y0, nCbS, nCbS / 2 ) | |
|         prediction_unit( x0, y0 + (nCbS / 2 ), nCbS, nCbS / 2 ) | |
|       } else if( PartMode = = PART_Nx2N ) { | |
|         prediction_unit( x0, y0, nCbS / 2, nCbS ) | |
|         prediction_unit( x0 + (nCbS / 2 ), y0, nCbS / 2, nCbS ) | |
|       } else if( PartMode = = PART_2NxnU ) { | |
|         prediction_unit( x0, y0, nCbS, nCbS / 4 ) | |
|         prediction_unit( x0, y0 + ( nCbS / 4 ), nCbS, nCbS * 3 / 4 ) | |
|       } else if( PartMode = = PART_2NxnD ) { | |
|         prediction_unit( x0, y0, nCbS, nCbS * 3 / 4 ) | |
|         prediction_unit( x0, y0 + ( nCbS * 3 / 4 ), nCbS, nCbS / 4 ) | |
|       } else if( PartMode = = PART_nLx2N ) { | |
|         prediction_unit( x0, y0, nCbS / 4, nCbS ) | |
|         prediction_unit( x0 + ( nCbS / 4 ), y0, nCbS * 3 / 4, nCbS ) | |
|       } else if( PartMode = = PART_nRx2N ) { | |
|         prediction_unit( x0, y0, nCbS * 3 / 4, nCbS ) | |
|         prediction_unit( x0 + ( nCbS * 3 / 4 ), y0, nCbS / 4, nCbS ) | |
|       } else { /* PART_NxN */ | |
|         prediction_unit( x0, y0, nCbS / 2, nCbS / 2 ) | |
|         prediction_unit( x0 + (nCbS / 2), y0, nCbS / 2, nCbS / 2 ) | |

| | Descriptor |
|---|---|
| ```
              prediction_unit( x0, y0 + ( nCbS / 2 ), nCbS / 2, nCbS / 2 )
      prediction_unit( x0 + ( nCbS / 2 ), y0 + ( nCbS / 2 ), nCbS / 2, nCbS / 2
)
            }
        }
        if ( icEnableFlag )
            ic_flag
        if( vps_inter_sdc_flag && PredMode[ x0 ][ y0 ] ! =
MODE_INTRA
                && !skip_flag[ x0 ][ y0 ] )
            inter_sdc_flag
        if( inter_sdc_flag ) {
            puNum = ( PartMode = = PART_2Nx2N ) ? 1 : ( PartMode = =
PART_NxN ? 4 : 2 )
            for( i = 0; i < puNum; i++ ) {
                inter_sdc_resi_abs_minus1[ x0 ][ y0 ][ i ]
                inter_sdc_resi_sign_flag[ x0 ][ y0 ][ i ]
            }
        }
        if( !pcm_flag[ x0 ][ y0 ] ) {
            if( CuPredMode[ x0 ][ y0 ] != MODE_INTRA &&
                !( PartMode = = PART_2Nx2N && merge_flag[ x0 ][ y0 ] ) )
                rqt_root_cbf
            if( rqt_root_cbf && !inter_sdc_flag) {
                MaxTrafoDepth = ( CuPredMode[ x0 ][ y0 ] = = =
MODE_INTRA ?
                                ( max_transform_hierarchy_depth_intra +
IntraSplitFlag ) :
                                max_transform_hierarchy_depth_inter )
                transform_tree( x0, y0, x0, y0, log2CbSize, 0, 0 )
            }
        }
    }
}
``` | |
| | ae(v) |
| | ae(v) |
| | ae(v) ae(v) |
| | ae(v) |

H.7.3.8.5.1 Depth Mode Parameter Syntax

| | Descriptor |
|---|---|
| ```
depth_mode_parameters( x0 , y0 , log2CbSize ) {
    depth_intra_mode[ x0 ][ y0 ]
    if( DepthIntraMode[ x0 ][ y0 ] = =
        INTRA_DEP_DMM_WFULL | |
        DepthIntraMode[ x0 ][ y0 ] = =
INTRA_DEP_SDC_DMM_WFULL )
        wedge_full_tab_idx[ x0 ][ y0 ]
    if( DmmFlag[ x0 ][ y0 ] | | SdcFlag[ x0 ][ y0 ] ) {
        dcNumSeg = ( DepthIntraMode[ x0 ][ y0 ] = =
INTRA_DEP_SDC_PLANAR ) ? 1 : 2
        depth_dc_flag[ x0 ][ y0 ]
        if ( depth_dc_flag[ x0 ][ y0 ] )
            for( i = 0; i < dcNumSeg; i ++ ) {
                depth_dc_abs[ x0 ][ y0 ][ i ]
                if ( depth_dc_abs[ x0 ][ y0 ][ i ])
                    depth_dc_sign_flag[ x0 ][ y0 ][ i ]
            }
    }
}
``` | ae(v) ae(v) ae(v) ae(v) |

Semantics vps_inter_sdc_flag[layerId] equal to 1 specifies that inter SDC coding is used for the layer with nuh_layer_id equal to layerId. vps_inter_sdc_flag[layerId] equal to 0 specifies that inter SDC coding is not used for the layer with nuh_layer_id equal to layerId. When not present, the value of vps_inter_sdc_flag[layerId] is inferred to be equal to 0.

inter_sdc_flag equal to 1 specifies simplified depth coding of residual blocks is used for the current coding unit. inter_sdc_flag equal to 0 specifies simplified depth coding of residual blocks is not used for the current coding unit. When not present, inter_sdc_flag is inferred to be equal to 0.

inter_sdc_resi_abs_minus1[x0][y0][i]. inter_sdc_resi_sign_flag[x0][y0][i] are used to derive InterSdcResi[x0][y0][i] as follows:

(H-19)    InterSdcResi[x0][y0][i]=(1−2*inter_sdc_resi_sign_flag[x0][y0][i])*(inter_sdc_resi_abs_minus1[x0][y0][i]+1)

H.7.4.9.5.1 Depth Mode Parameter Semantics

The variable Log 2MaxDmmCbSize is set equal to 5.

The variables depthIntraModeSet is derived as specified in the following:

If log 2CbSize is equal to 6, depthIntraModeSet is set equal to 0.

Otherwise, if log 2CbSize is equal to 3 and PartMode [xC][yC] is equal to PART_N×N, depthIntraModeSet is set equal to 1.

Otherwise, depthIntraModeSet is set equal to 2.

depth_intra_mode[x0][y0] specifies the depth intra mode of the current prediction unit. Table H-2 specifies the value of the variable depthIntraModeMaxLen depending on depthIntraModeSet and the value of the variable DepthIntraMode and the associated name depending on the on depth_intra_mode and depthIntraModeSet.

The variable SdcFlag[x0][y0] is derived as specified in the following:

(H-25) SdcFlag[x0][y0]=(DepthIntraMode[x0][y0]==INTRA_DEP_SDC_PLANAR)||(DepthIntraMode[x0][y]==INTRA_DEP_SDC_DMM_WFULL)

The variable DmmFlag[x0][y0] is derived as specified in the following:

(H-26)    DmmFlag[x0][y0]=(DepthIntraMode[x0][y0]==INTRA_DEP_DMM_WFULL)||(DepthIntraMode[x0][y0]==INTRA_DEP_DMM_CPREDTEX)

TABLE H-2

Specification of DepthIntraMode and associated name depending on depthIntraModeSet and depth_intra_mode and specification of and depthIntraModeMaxLen depending on depthIntraModeSet

| | depthIntraModeSet | 0 | 1 | 2 |
|---|---|---|---|---|
| | depthIntraModeMaxLen | 1 | 3 | 3 |
| DepthIntraMode | Associated name | | depth_intra_mode | |
| 0 | INTRA_DEP_SDC_PLANAR | 0 | — | 0 |
| 1 | INTRA_DEP_NONE | 1 | 0 | 1 |
| 2 | INTRA_DEP_SDC_DMM_WFULL | — | — | 2 |
| 3 | INTRA_DEP_DMM_WFULL | — | 1 | 3 |
| 4 | INTRA_DEP_DMM_CPREDTEX | — | — | 4 | wedge_full_tab_idx[x0][y0] specifies the index of the wedgelet pattern in the corresponding pattern list when DepthIntraMode[x0][y0] is equal to INTRA_DEP_DMM_WFULL. depth_dc_flag[x0][y0] equal to 1 specifies that depth_dc_abs[x0][y0][i] and depth_dc_sign_flag[x0][y0][i] are present. depth_dc_flag[x0][y0] equal to 0 specifies that depth_dc_abs[x0][y0][i] and depth_dc_sign_flag[x0][y0][i] are not present.
depth_dc_abs[x0][y0][i], depth_dc_sign_flag[x0][y0][i] are used to derive DcOffset[x0][y0][i] as follows:

(H-27) DcOffset[x0][y0][i]=(1−2*depth_dc_sign_flag [x0][y0][i])*(depth_dc_abs[x0][y0][i]−dcNumSeg+2)

Figure 5:
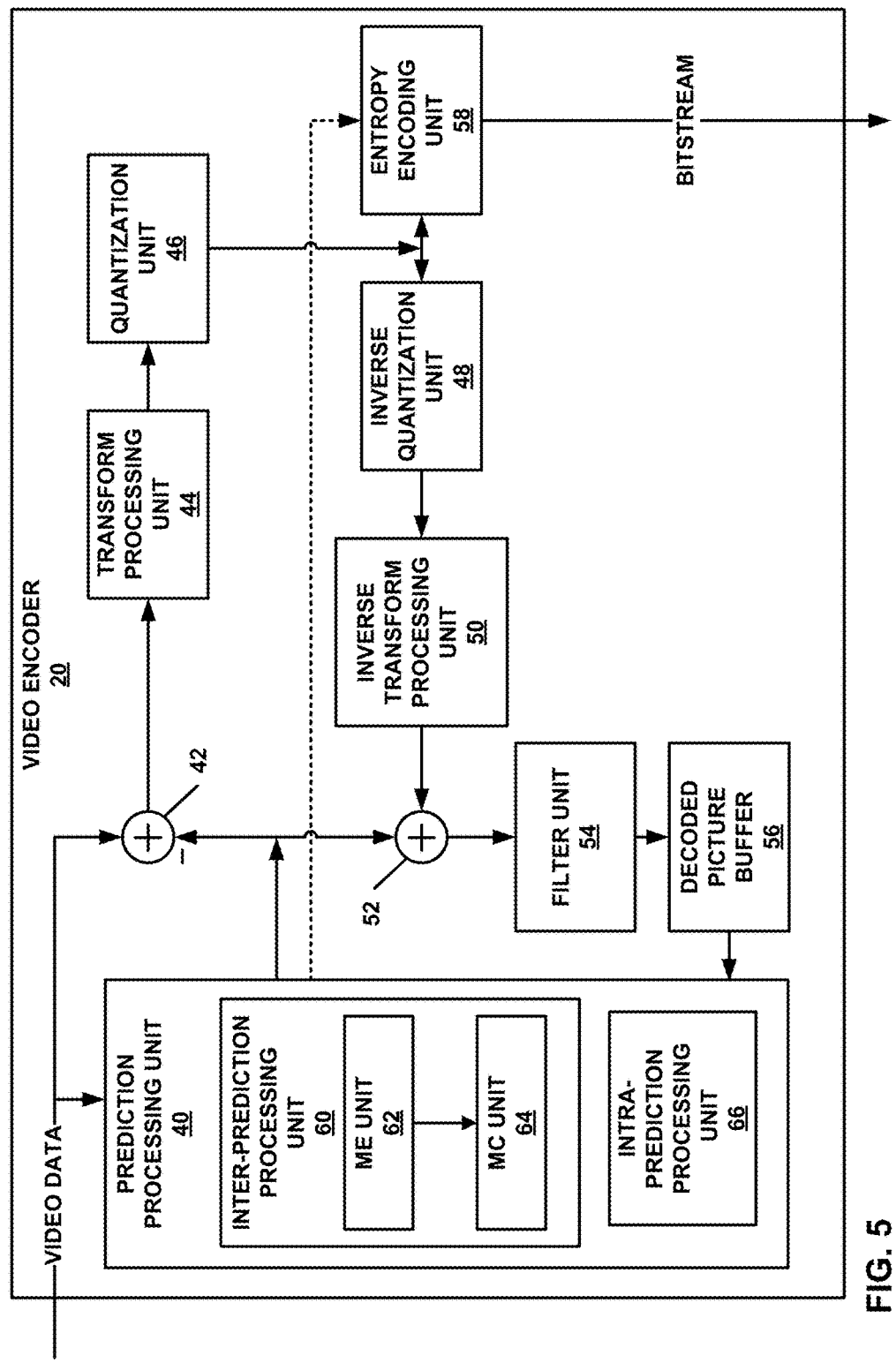
FIG. 5 is a block diagram illustrating an example of video encoder that may implement techniques for depth coding.

FIG. 5 is a block diagram illustrating an example video encoder 20 that may be configured to implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding and, more particularly, 3D-HEVC coding. However, the techniques of this disclosure may be applicable to other coding standards or methods.

In the example of FIG. 5, video encoder 20 includes a prediction processing unit 40, a residual generation unit 42, a transform processing unit 44, a quantization unit 46, an inverse quantization unit 48, an inverse transform processing unit 50, a reconstruction unit 52, a filter unit 54, and a decoded picture buffer 56, and an entropy encoding unit 58. Prediction processing unit 40 includes an inter-prediction processing unit 60 and an intra-prediction processing unit 66. Inter-prediction processing unit 60 includes a motion estimation (ME) unit 62 and a motion compensation (MC) unit 64.

For ease of illustration, the components of prediction processing unit 40 are illustrated and described as performing both texture encoding and depth encoding. In some examples, texture and depth encoding may be performed by the same components of prediction processing unit 40 or different components within prediction processing unit 40. For example, separate texture and depth encoders may be provided in some implementations. Also, multiple texture and depth encoders may be provided to encode multiple views, e.g., for multiview plus depth coding. In either case, prediction processing unit 40 may be configured to intra- or inter-encode texture data and depth data as part of a 3D coding process, such as a 3D-HEVC process.

Accordingly, prediction processing unit 40 may operate substantially in accordance with 3D-HEVC, e.g., as described in the 3D-HEVC WD, subject to modifications and/or additions described in this disclosure, such as those relating to the application of larger CU sizes to DMM modes. Prediction processing unit 40 may generate and encode residual data for intra-encoded or inter-encoded depth data using SDC or non-SDC residual coding techniques, as described in this disclosure. In some examples, video encoder 20 may include more, fewer, or different functional components than shown in FIG. 5.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 40 may perform quad-tree partitioning to divide the CTBs of the CTU into progressively-smaller blocks. The smaller block may be coding blocks of CUs. For example, prediction processing unit 40 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 40 may partition the coding blocks associated with the CU among one or more PUs of the CU. Thus, each PU may be associated with a luma prediction block and corresponding chroma prediction blocks.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 60 may generate predictive data for a PU by performing inter prediction on each PU of a CU. The predictive data for the PU may include a predictive sample blocks of the PU and motion information for the PU. Inter-prediction processing unit 60 may perform different operations for a PU of a CU depending on whether the PU is in an I slice, a P slice, or a B slice. In an I slice, all PUs are intra predicted. Hence, if the PU is in an I slice, inter-prediction processing unit 60 does not perform inter prediction on the PU. Thus, for blocks encoded in I-mode, the predicted block is formed using spatial prediction from previously-encoded neighboring blocks within the same frame.

If a PU is in a P slice, motion estimation (ME) unit 62 may search the reference pictures in a list of reference pictures (e.g., "RefPicList0") for a reference region for the PU. The reference pictures may be stored in decoded picture buffer 56. The reference region for the PU may be a region, within a reference picture, that contains sample blocks that most closely corresponds to the sample blocks of the PU. Motion estimation (ME) unit 62 may generate a reference index that indicates a position in RefPicList0 of the reference picture containing the reference region for the PU. In addition, motion estimation (ME) unit 62 may generate a motion vector (MV) that indicates a spatial displacement between a coding block of the PU and a reference location associated with the reference region. For instance, the MV may be a two-dimensional vector that provides an offset from the coordinates in the current decoded picture to coordinates in a reference picture. Motion estimation (ME) unit 62 may output the reference index and the MV as the motion information of the PU. Motion compensation (MC) unit 64 may generate the predictive sample blocks of the PU based on actual or interpolated samples at the reference location indicated by the motion vector of the PU.

If a PU is in a B slice, motion estimation unit 62 may perform uni-prediction or bi-prediction for the PU. To perform uni-prediction for the PU, motion estimation unit 62 may search the reference pictures of RefPicList0 or a second reference picture list ("RefPicList1") for a reference region for the PU. Motion estimation (ME) unit 62 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation (MC) unit 64 may generate the predictive sample blocks of the PU based at least in part on actual or interpolated samples at the reference region indicated by the motion vector of the PU.

To perform bi-directional inter prediction for a PU, motion estimation unit 62 may search the reference pictures in RefPicList0 for a reference region for the PU and may also search the reference pictures in RefPicList1 for another reference region for the PU. Motion estimation (ME) unit 62 may generate reference picture indexes that indicate positions in RefPicList0 and RefPicList1 of the reference pictures that contain the reference regions. In addition, motion estimation (ME) unit 62 may generate MVs that indicate spatial displacements between the reference location associated with the reference regions and a sample block of the PU. The motion information of the PU may include the reference indexes and the MVs of the PU. Motion compensation (MC) unit 64 may generate the predictive sample blocks of the PU based at least in part on actual or interpolated samples at the reference region indicated by the motion vector of the PU.

Intra-prediction processing unit 66 may generate predictive data for a PU by performing intra prediction on the PU. The predictive data for the PU may include predictive sample blocks for the PU and various syntax elements. Intra-prediction processing unit 66 may perform intra prediction on PUs in I slices, P slices, and B slices.

To perform intra prediction on a PU, intra-prediction processing unit 66 may use multiple intra prediction modes to generate multiple sets of predictive data for the PU, and then select one of the intra-prediction modes that yields acceptable or optimal coding performance (or "coding efficiency"), e.g., using rate-distortion optimization techniques. To use an intra prediction mode to generate a set of predictive data for the PU, intra-prediction processing unit 66 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 66 may use various numbers of intra prediction modes, e.g., 33 directional intra prediction modes. In some examples, the number of intra prediction modes may depend on the size of the region associated with the PU.

In addition, intra-prediction processing unit 66 may be configured to code depth blocks of a depth map. For example, intra-prediction processing unit 66 may use intra-prediction modes from the base (2D) HEVC standard (as described, for example, with respect to FIG. 2 above), with depth modeling modes (DMMs) (as described, for example, with respect to FIGS. 3A and 3B above) to code an intra-predicted PU of a depth slice.

Prediction processing unit 40 may select the predictive data for PUs of a CU from among the predictive data generated by inter-prediction processing unit 60 for the PUs or the predictive data generated by intra-prediction processing unit 66 for the PUs. In some examples, prediction processing unit 40 selects the predictive data for the PUs of the CU based on rate/distortion metrics of the sets of predictive data. The predictive sample blocks of the selected predictive data may be referred to herein as the selected predictive sample blocks.

Residual generation unit 42 may generate, based on the luma, Cb and Cr coding block of a CU and the selected predictive luma, Cb and Cr blocks of the PUs of the CU, a luma, Cb and Cr residual blocks of the CU. For instance, residual generation unit 42 may generate the residual blocks of the CU such that each sample in the residual blocks has a value equal to a difference between a sample in a coding block of the CU and a corresponding sample in a corresponding selected predictive sample block of a PU of the CU.

Transform processing unit 44 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 44 may generate transform coefficient blocks for each TU of a CU by applying one or more transforms to the transform blocks of the TU. Transform processing unit 44 may apply various transforms to a transform block associated with a TU. For example, transform processing unit 44 may apply a discrete cosine transform (DCT), a directional transform, or a conceptually similar transform to a transform block. In some examples, transform processing unit 44 does not apply transforms to a transform block. In such examples, the transform block may be treated as a transform coefficient block.

Quantization unit 46 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 46 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 48 and inverse transform processing unit 50 may apply inverse quantization and inverse transforms to a coefficient block, respectively, to reconstruct a residual block from the coefficient block. Reconstruction unit 52 may add the reconstructed residual block to corresponding samples from one or more predictive sample blocks generated by prediction processing unit 40 to produce a reconstructed transform block associated with a TU. By reconstructing transform blocks for each TU of a CU in this way, video encoder 20 may reconstruct the coding blocks of the CU.

Filter unit 54 may perform one or more deblocking operations to reduce blocking artifacts in the coding blocks associated with a CU. Decoded picture buffer 56 may store the reconstructed coding blocks after filter unit 54 performs the one or more deblocking operations on the reconstructed coding blocks. Inter-prediction unit 60 may use a reference picture that contains the reconstructed coding blocks to perform inter prediction on PUs of other pictures. In addition, intra-prediction processing unit 66 may use reconstructed coding blocks in decoded picture buffer 56 to perform intra prediction on other PUs in the same picture as the CU.

Entropy encoding unit 58 may receive data from other functional components of video encoder 20. For example, entropy encoding unit 58 may receive coefficient blocks from quantization unit 46 and may receive syntax elements from prediction processing unit 40. Entropy encoding unit 58 may perform one or more entropy encoding operations on the data to generate entropy-encoded data. For example, entropy encoding unit 58 may perform a CABAC operation, a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 58. For instance, the bitstream may include data that represents a RQT for a CU.

Video encoder 20 is an example of a video encoder configured to perform any of the techniques described in this disclosure. In accordance with one or more techniques of this disclosure, one or more units within video encoder 20 may perform one or more techniques described herein as part of a video encoding process. Similarly, video encoder 20 may perform a video decoding process using any of the techniques of this disclosure, to reproduce video data used as reference for subsequently coded video data. As discussed above, inverse quantization unit 48, inverse transform processing unit 50, and reconstruction unit 52, among other elements of video encoder 20, may be utilized in the video decoding process. Additional 3D processing components may also be included within video encoder 20.

For example, prediction processing unit 40 and, more particularly, inter-prediction processing unit 60 and intra-prediction processing unit 66, may perform an SDC mode for depth inter prediction and depth intra prediction encoding, respectively, of depth blocks as described herein. Inter-prediction processing unit 60 and intra-prediction processing unit 66, when used, may each determine a DC residual value for a depth block, e.g., PU, or each partition thereof. Prediction processing unit 60 may generate a syntax element and/or syntax structures that indicate the mode that is used fro the current CU.

Figure 6:
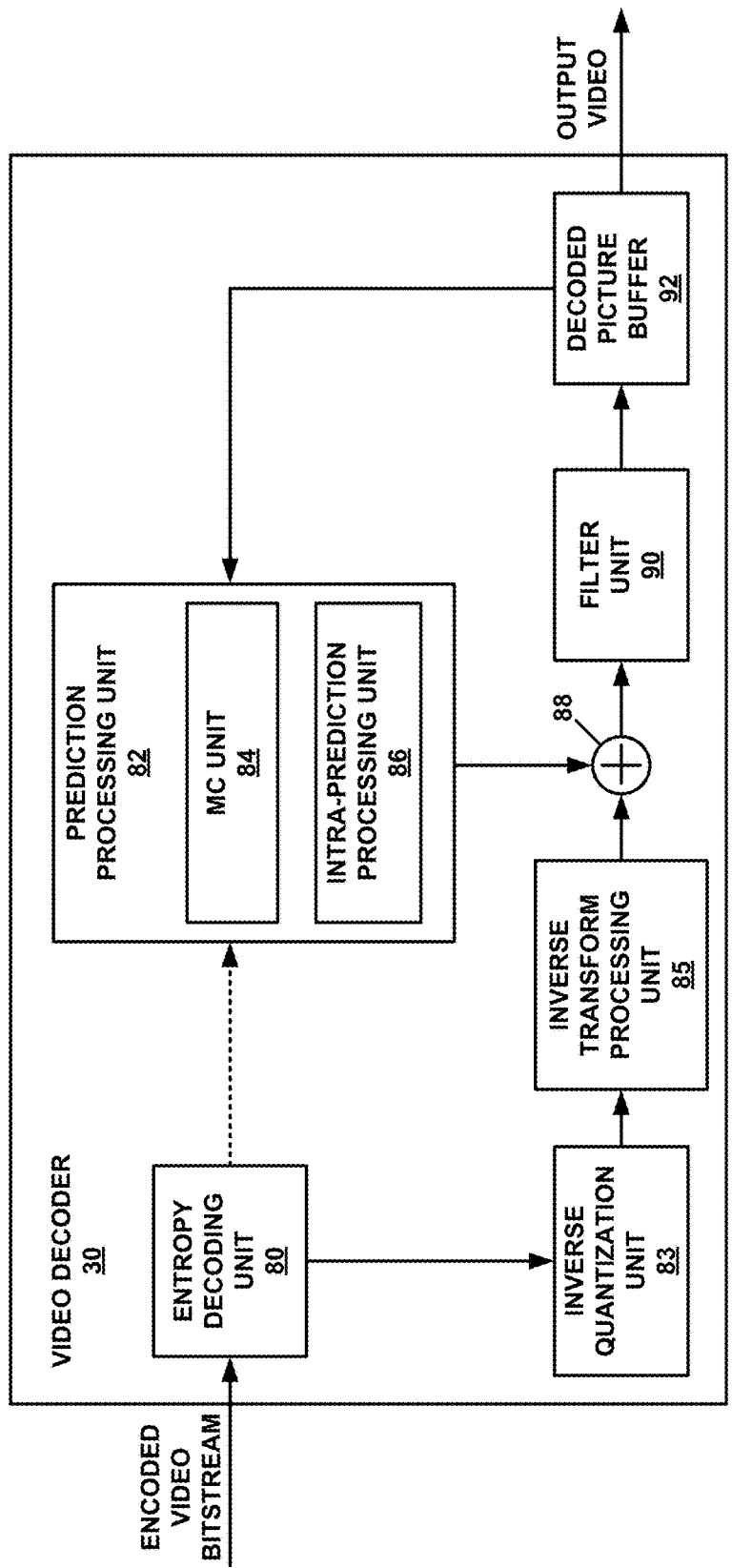
FIG. 6 is a block diagram illustrating an example of video decoder that may implement techniques for depth coding.

Intra-prediction processing unit 66 or inter-prediction processing unit 60 may provide DC residual value(s) for the depth block, along with other syntax information, to entropy encoding unit 58, e.g., as illustrated by the dashed line in FIG. 6. Intra-prediction processing unit 66 or inter-prediction processing unit 60 may provide the DC residual values to entropy encoding unit 58 without the values being processed by transform processing unit 44 and quantization unit 46. In other examples, quantization unit 46 may quantize the DC residual values prior to entropy coding by entropy encoding unit 58. The syntax information may include various information, flags, or other syntax elements described herein for signaling in association with the techniques of this disclosure.

For example, the syntax information may indicate, as examples, whether the SDC mode is performed for the depth block, whether a partition-based (e.g., 3D-HEVC) or non-partition-based (HEVC) mode was used to determine the DC residual value, and which depth intra prediction mode was used to determine the DC residual value. According to the SDC mode, video encoder 20 is configured to determine at least one DC residual value for the depth block (e.g., a partition of a PU of a CU) based on the indicated one of the depth intra prediction modes or depth inter prediction modes, wherein the DC residual value represents a residual value of a plurality of pixels of the depth block, and encode the DC residual value or information representing the DC residual value into the bitstream.

In this sense, video encoder 20 may be configured to implement one or more example techniques described in this disclosure. For example, intra-prediction processing unit 66 may be configured to implement the example intra-prediction encoding techniques for a depth block described in this disclosure. In some examples, intra-prediction processing unit 66 in combination with other processors may be configured to implement the techniques described in this disclosure.

In accordance with techniques of the disclosure, prediction processing unit 40 may define a 64×64 or larger depth prediction unit (PU) within a depth coding unit (CU). Upon defining a 64×64 depth PU, prediction processing unit 40 may generate one or more partitions of the 64×64 depth PU. Prediction processing unit 40 may further generate prediction data for each of the partitions, as described in this disclosure. Using the prediction data and the depth values, reconstruction unit 52 may generate residual data for each of the partitions. In some examples, the residual data may be further processed by transform processing unit 44, quantization unit 46, and/or entropy coding unit 58. Prediction processing unit 40 and/or one or more other components of video encoder 20 may generate syntax data indicating the prediction data, the residual data, and the partitioning of the 64×64 depth PU. In this way, video encoder 20 may generate a bitstream for coding a depth map of a 64×64 or larger-size coding unit (CU) using Depth Modeling Modes (DMMs), e.g., such as Wedgelet partitioning. Further details of the encoding process are described in FIGS. 7-9 of this disclosure.

In some examples, video encoder 20 may use a depth lookup table (DLT) that maps depth indexes to depth values. Video encoder 20 may use a DLT to improve coding efficiency by signaling an index value that corresponds to a depth value, rather than the depth value itself. To construct a DLT, video encoder 20 may analyze the frames within a first intra period before encoding the full sequence. In some examples, all the valid depth values are sorted in ascending order and inserted to DLT with increasing indexes.

Video encoder 20 may not use a DLT in all coding situations. For instance, video encoder 20 may not use a DLT if more than half the values from 0 to MAX_DEPTH_VALUE (e.g., 255 for 8-bit depth samples) appear in the original depth map when analyzing the frames within a first intra period before encoding the full sequence. Otherwise, video encoder 20 may encode a DLT in a sequence or video parameter set. In order to code DLT, video encoder 20 encodes the number of valid depth values with Exp-Golomb code first. Then each valid depth value is also coded with an Exp-Golomb code.

A valid depth value may be a value that appeared in the original depth map when analyzing the frames within the first intra period before encoding the full sequence. Accordingly, video encoder 20 may read a pre-defined number of frames from the input video sequence to be coded and scan all samples for available depth map values. During this process video encoder 20 may generate a mapping table that maps depth values to valid depth values based on the original uncompressed depth map.

The Depth Lookup Table Idx2Depth(.), the Index Lookup Table Depth2Idx(.), the Depth Mapping Table M(.) and the number of valid depth values $d_{valid}$ are derived by the following techniques, that analyses the depth map Dt:

1. Initialization
boolean vector B(d)=FALSE for all depth values d
index counter i=0
2. Process each pixel position p in $D_t$ for multiple time instances t:
Set B($D_t$(p))=TRUE to mark valid depth values
3. Count number of TRUE values in B(d)→$d_{valid}$
4. For each d with B(d)==TRUE:
Set Idx2Depth(i)=d
Set M(d)=d
Set Depth2Idx(d)=i
i=i+1
5. For each d with B(d)==FALSE:
Find d̂=arg min|d−d̂| and B(d̂)==TRUE
Set M(d)=d̂
Set Depth2Idx(d)=Depth2Idx(d̂)
Mapping from an index Id back to a depth value d is as follows: d=Idx2Depth[Idx].
Mapping from a depth value d to an index Idx is as follows: Idx=Depth2Idx[d].

FIG. 6 is a block diagram illustrating an example video decoder 30 that is configured to perform the techniques of this disclosure. FIG. 6 is provided for purposes of explanation and should not be considered limiting of the techniques as broadly exemplified and described in this disclosure. For purposes of explanation, this disclosure describes video decoder 30 in the context of HEVC coding and, in particular, 3D-HEVC coding. However, the techniques of this disclosure may be applicable to other 3D video coding standards or methods.

In the example of FIG. 6, video decoder 30 includes an entropy decoding unit 80, a prediction processing unit 82, an inverse quantization unit 83, an inverse transform processing unit 85, a reconstruction unit 88, a filter unit 90, and a decoded picture buffer 92. Prediction processing unit 82 includes a motion compensation (MC) unit 84 and an intra-prediction processing unit 86.

For ease of illustration, the components of prediction processing unit 82 are illustrated and described as performing both texture decoding and depth decoding. In some examples, texture and depth decoding may be performed by the same components of prediction processing unit 82 or different components within prediction processing unit 82. For example, separate texture and depth decoders may be provided in some implementations. Also, multiple texture and depth decoders may be provided to decode multiple views, e.g., for multiview plus depth coding. In either case, prediction processing unit 82 may be configured to intra- or inter-decode texture data and depth data as part of a 3D coding process, such as a 3D-HEVC process.

Accordingly, prediction processing unit 82 may operate substantially in accordance with 3D-HEVC, subject to modifications and/or additions described in this disclosure, such as those relating to application of larger CU sizes to DMM modes. Prediction processing unit 82 may obtain residual data from the encoded video bitstream for intra-decoded or inter-decoded depth data using SDC or non-SDC residual coding techniques as described in this disclosure, and reconstruct CU's using intra-predicted or inter-predicted depth data and the residual data. In some examples, video decoder 30 may include more, fewer, or different functional components than shown in FIG. 6.

Video decoder 30 may receive a bitstream. Entropy decoding unit 80 may parse the bitstream to decode syntax elements from the bitstream. Entropy decoding unit 80 may entropy decode entropy-encoded syntax elements in the bitstream. Prediction processing unit 82, inverse quantization unit 83, inverse transform processing unit 85, reconstruction unit 88, and filter unit 90 may generate decoded video data based on the syntax elements extracted from the bitstream.

The bitstream may comprise a series of Network Abstraction Layer (NAL) units. The NAL units of the bitstream may include coded slice NAL units. As part of decoding the bitstream, entropy decoding unit 80 may extract and entropy decode syntax elements from the coded slice NAL units. Each of the coded slices may include a slice header and slice data. The slice header may contain syntax elements pertaining to a slice. The syntax elements in the slice header may include a syntax element that identifies a picture parameter set (PPS) associated with a picture that contains the slice. The PPS may refer to a sequence parameter set (SPS), which may in turn refer to a video parameter set (VPS). Entropy decoding unit 80 may also entropy decode other elements that may include syntax information, such as supplemental enhancement information (SEI) messages.

Decoded syntax elements in any of the slice header, parameter sets, or SEI messages may include information described herein as being signaled in accordance with example techniques described in this disclosure. Such syntax information may be provided to prediction processing unit 82 for decoding and reconstruction of a depth block according to the techniques described in this disclosure.

In general, in addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct blocks of the CU.

As part of performing a reconstruction operation on a TU of a CU, inverse quantization unit 83 may inverse quantize, i.e., de-quantize, coefficient blocks associated with the TU. Inverse quantization unit 83 may use a quantization parameter (QP) value associated with the CU of the TU to determine a degree of quantization and, likewise, a degree of inverse quantization for inverse quantization unit 83 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 83 inverse quantizes a coefficient block, inverse transform processing unit 85 may apply one or more inverse transforms to the coefficient block in order to generate a residual block associated with the TU. For example, inverse transform processing unit 85 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 86 may perform intra prediction to generate predictive blocks for the PU. Intra-prediction processing unit 86 may use an intra prediction mode to generate the predictive luma, Cb and Cr blocks for the PU based on the prediction blocks of spatially-neighboring PUs. Intra-prediction processing unit 86 may determine the intra prediction mode for the PU based on one or more syntax elements decoded from the bitstream.

Prediction processing unit 82 may construct a first reference picture list (RefPicList0) and a second reference picture list (RefPicList1) based on syntax elements extracted from the bitstream. Furthermore, if a PU is encoded using inter prediction, entropy decoding unit 80 may extract motion information for the PU. Motion compensation (MC) unit 84 may determine, based on the motion information of the PU, one or more reference regions for the PU. Motion compensation (MC) unit 84 may generate, based on samples blocks at the one or more reference blocks for the PU, predictive luma, Cb and Cr blocks for the PU.

Continuing reference is now made to FIG. 6. Reconstruction unit 88 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 88 may add samples of the luma, Cb and Cr transform blocks to corresponding samples of the predictive luma, Cb and Cr blocks to reconstruct the luma, Cb and Cr coding blocks of the CU.

Filter unit 90 may perform a deblocking operation to reduce blocking artifacts associated with the luma, Cb and Cr coding blocks of the CU. Video decoder 30 may store the luma, Cb and Cr coding blocks of the CU in decoded picture buffer 92. Decoded picture buffer 92 may provide reference pictures for subsequent motion compensation, intra prediction, and presentation on a display device, such as display device 32 of FIG. 2. For instance, video decoder 30 may perform, based on the luma, Cb and Cr blocks in decoded picture buffer 92, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Video decoder 30 is an example of a video decoder configured to perform any of the techniques for application of larger CU sizes to DMM modes, as described herein. In accordance with one or more techniques of this disclosure, one or more units within video decoder 30 may perform one or more techniques described herein as part of a video decoding process. Additional 3D coding components may also be included within video decoder 30.

For example, prediction processing unit 82 and, more particularly, intra-prediction processing unit 86 and motion compensation (MC) unit 84, may determine whether to perform SDC in depth intra-prediction modes and depth inter-prediction modes, as applicable, of a 3D video coding process, such as 3D-HEVC. Entropy decoding unit 80 may entropy decode one or more DC residual values for a depth block, as well as syntax information described herein. e.g., indicating whether depth intra prediction or depth inter prediction was used to encode the block, as well as whether the SDC mode was performed for the depth intra prediction or depth inter prediction to encode the block.

Entropy decoding unit 80 may provide the DC residual value(s) and the syntax information for the block to prediction processing unit 82, as indicated by the dashed line in FIG. 6. In this manner, the DC residual value(s) need not be first provided to inverse quantization unit 83 and inverse transform processing unit 85 for inverse quantization and inverse transformation. In other examples, inverse quantization unit 83 may inverse quantize the DC residual value(s), and provide de-quantized DC residual values to prediction processing unit 82.

Motion compensation (MC) unit 84 may determine predictive samples for the depth block based on a depth inter prediction mode, as indicated by syntax information, e.g., according to any of the technique described herein. Motion compensation (MC) unit 84 may utilize reconstructed depth blocks from reference pictures stored in decoded picture buffer 92 to determine the predictive samples of the inter-predicted depth block. If the SDC mode is indicated, i.e., for depth intra-prediction and inter-prediction, motion compensation (MC) unit 84 applies SDC to reconstruct the depth block.

Motion compensation (MC) unit 84 may reconstruct the depth block by summing the DC residual value and the predictive samples. In some examples, motion compensation (MC) unit 84 may utilize reconstruction unit 88 for the summing of the residual and predictive samples for the inter-predicted depth block. For example, entropy decoding unit 80 may provide the DC residual value(s) to the reconstruction unit 88, and motion compensation (MC) unit 84 may provide the predictive samples to the reconstruction unit 88.

Intra-prediction processing unit 86 may determine predictive samples for the depth block based on the depth intra prediction mode indicated by the syntax information, e.g., according to any of the technique described herein. Intra-prediction processing unit 86 may utilize reconstructed depth blocks stored in decoded picture buffer 92 to determine the predictive samples. Intra-prediction processing unit 86 may reconstruct the depth block by summing the residual value(s) and the predictive samples, as described herein. In some examples, intra-prediction processing unit 86 may utilize reconstruction unit 88 for the summing of the residual and predictive samples for the depth block. For example, entropy decoding unit 80 may provide the residual value(s)

to the reconstruction unit, and intra prediction processing unit 86 may provide the predictive samples to the reconstruction unit.

The techniques described above may be performed by video encoder 20 (FIGS. 1 and 5) and/or video decoder 30 (FIGS. 1 and 6), both of which may be generally referred to as a video coder. In addition, video coding may generally refer to video encoding and/or video decoding, as applicable.

In accordance with techniques of the disclosure, prediction processing unit 82 may define a depth prediction unit (PU) greater than 32×32 in size within a depth coding unit (CU). Although described with respect to a 64×64 depth PU as an example of a depth PU greater than 32×32, techniques of the disclosure, generally, are applicable to depth PUs of sizes greater than 32×32. Upon defining the 64×64 depth PU, prediction processing unit 82 may generate one or more partitions of the 64×64 depth PU. Prediction processing unit 82 may further obtain prediction data for each of the partitions, as described in this disclosure. Using the prediction data and the residual values included in encoded video data received from video encoder 20, reconstruction unit 88 may obtain residual data for each of the partitions. In some examples, the residual data may be further processed by inverse transform processing unit 85, inverse quantization unit 83, and/or entropy coding unit 80. Reconstruction unit 88 and prediction processing unit 82, based on the syntax data indicating the prediction data, the residual data, and the partitioning of the 64×64 depth PU may reconstruct each depth value of a depth map. In this way, video encoder 20 may decode a bitstream for a depth map of a 64×64 or larger-size coding unit (CU) using Depth Modeling Modes (DMMs). Further details of the encoding process are described in FIGS. 8-10 of this disclosure.

Figure 7:
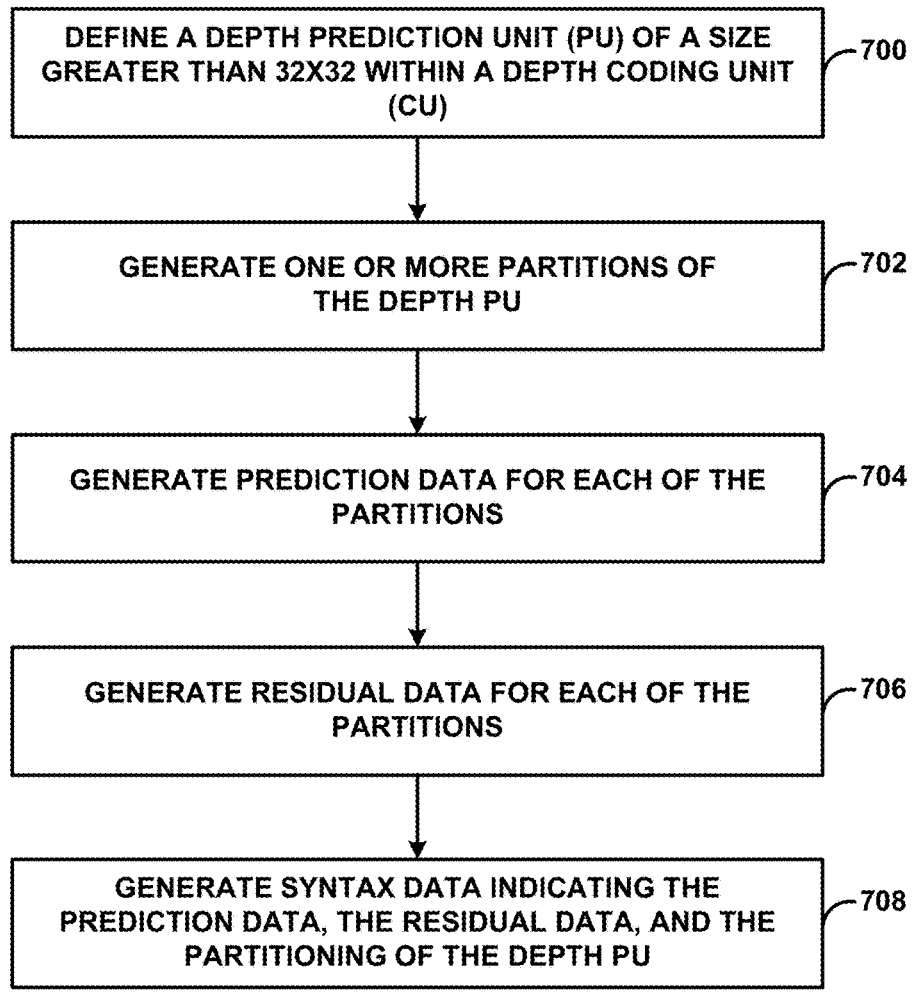
FIG. 7 is a flowchart illustrating an example method of encoding video data.

FIG. 7 is a flowchart illustrating an example method of encoding video data. For purposes of illustration, the example operations are described below within the context of video encoder 20 in FIGS. 1 and 5. In particular, FIG. 7 illustrates techniques of video encoder 20 that extend DMM modes, including DMM mode 1 and/or DMM mode 4 and any other depth modeling modes, to PUs that are greater than 32×32 in size, such as 64×64 PUs, for depth coding in 3D-HEVC. In the example of FIG. 7, prediction processing unit 40 performs texture encoding and depth encoding, although in other examples, different components within video encoder 20 may also perform one or more texture encoding and/or depth encoding techniques. In either case, prediction processing unit 40 may be configured to intra- or inter-encode texture data and depth data as part of a 3D coding process, such as a 3D-HEVC process.

In accordance with techniques of the disclosure, prediction processing unit 40 receives video data that includes texture components of a texture view and depth maps of a depth view. The video data may be represented by a sequence of access units, where each access unit includes all data corresponding to a particular temporal instance. In the encoding process, prediction processing unit 40 may receive a depth map and define a depth prediction unit (PU) greater than 32×32 in size within a depth coding unit (CU) (700). In some examples, to define the PU greater than 32×32 in size, prediction processing unit 40 may define the PU using Depth Modeling Mode (DMM) 1.

In some examples, to produce a Wedgelet partition pattern greater than 32×32, prediction processing unit 40 may select a Wedgelet partition pattern greater than 32×32 in size from a pre-defined Wedgelet pattern list for the current PU. The Wedgelet partition pattern greater than 32×32 in size that is signaled by video encoder 20 may be the partition pattern that provides a determined (e.g., a best or first coding efficiency that satisfies a threshold) coding efficiency (e.g., based on a rate distortion metric or other suitable measure) among each of the partition patterns in the pre-defined pattern list that includes Wedgelet partition patterns greater than 32×32 in size. For instance, prediction processing unit 40 may store a pattern list that includes, but is not limited to, multiple, different pre-defined Wedgelet partition patterns greater than 32×32 in size. In some examples, the best or highest coding efficiency may be a rate distortion metric or other suitable measure that is greater than a threshold. In some examples, the threshold may be a rate distortion metric or other suitable measure of another Wedgelet partition pattern.

Each Wedgelet partition pattern may be mapped in the pattern list to a particular identifier or index value that identifies the partition pattern. Prediction processing unit 40 may generate the pre-defined wedgelet pattern list by connecting all possible start and end point positions with a specified start/end point resolution of half-sample, full-sample, two samples, three samples or four samples. In some examples, a 64×64 pre-defined wedgelet pattern list is generated in the same way as other PU sizes ranging from 4×4 to 32×32, by connecting all possible start and end point positions with a specified start/end point resolution of half-sample, full-sample, two samples, three samples or four samples, to name only a few examples. Accordingly, in some examples, prediction processing unit 40 may perform the signaling of Wedgelet partition pattern greater than 32×32 in size and/or the DC prediction process in the similar way to other PU sizes ranging from 4×4 to 32×32 of 3D-HEVC.

Prediction processing unit 40 may generate one or more partitions of the depth PU greater than 32×32 in size (702). The generated partitions may be based on partition patterns included in the wedgelet pattern list. As previously described in FIGS. 3A-3B, prediction processing unit 40 may generate an N×N Wedgelet partition pattern, given a start point (xS, yS) and an end point (xE, yE) position. Initially, prediction processing unit 40 may first generate a temporary K×K partition pattern with all samples initialized as 0. Prediction processing unit 40 may set the samples which form the partition boundary line connecting (xS, yS) and (xE, yE) as 1, and divide the temporary partition pattern as two parts (e.g., part A and part B as illustrated in FIGS. 4A-4F). After prediction processing unit 40 divides the temporary partition pattern as two parts, prediction processing unit 40 may select one of the two parts to be partition 1 and the remaining part to be partition 2. Prediction processing unit 40 may be configured to select which of the parts is partition 1 based on the orientation of the Wedgelet pattern boundary line as described in FIGS. 4A-4F.

Upon generating the one or more partitions of the depth PU greater than 32×32 in size, prediction processing unit 40 may generate prediction data for each of the partitions (704). In some examples, prediction data is one or more values determined or otherwise selected by prediction processing unit 40 as predictive samples for corresponding pixel values in the PU. Prediction processing unit 40 generates residual data based on a difference between the predictive samples and the corresponding pixel values. The residual data may be used by video decoder 30 to reconstruct video data. In some examples, prediction data may be a pixel specific predictor value (or "predictive sample"), an average value, or a single value, to name only a few examples. For HEVC intra prediction modes, prediction processing unit 40 may generate a pixel specific predictive sample for each pixel in the PU by using neighboring samples of the PU, e.g., as specified in sub-clause 8.4.2 in the HEVC working draft.

In some examples, prediction processing unit 40 may use a different prediction technique for each partition. For instance, prediction processing unit 40 may use a first, particular prediction technique (e.g., a first intra-prediction mode) to select or otherwise determine predictive samples for a first partition of the PU, and may use a second, different prediction technique (e.g., a second intra-prediction mode) to select or otherwise determine predictive samples for a second partition of the PU. In some examples, prediction processing unit 40 may use the same prediction technique for each partition to select or otherwise determine predictive samples for the partitions of the PU.

Prediction processing unit 40 may provide predictive samples to residual generation unit 42, which generates residual data for each of the partitions (706). Residual generation unit 42 may generate residual data, based on the depth values of a partition and prediction data. For instance, residual generation unit 42 may generate residual values that are each equal to a difference between a depth pixel value in a partition and a corresponding predictive sample of the prediction data.

In some examples, for each or a subset of the different, pre-defined Wedgelet partition patterns in the pattern list that corresponds to a different block size, video encoder 20 may store information that indicates or is otherwise usable to determine the coding efficiency of applying a particular Wedgelet partition pattern for a particular block size. In other words, video encoder 20 may perform operations 700-706 of FIG. 7 for all of the Wedgelet patterns for all or a subset of block sizes to generate information that indicates or is otherwise usable to determine the coding efficiency of applying a particular Wedgelet partition pattern for a particular block size, e.g., in terms of a rate-distortion metric. In this way, prediction processing unit 40 may select, based on the stored information, the Wedgelet partition pattern for the particular block size that yields a determined coding efficiency (e.g., a best or first coding efficiency that satisfies a threshold).

Upon determining the Wedgelet partition pattern for the block size of greater than 32×32 in size, prediction processing unit 40 may generate syntax data that indicates the prediction data, the residual data, and/or the partitioning of the PU greater than 32×32 in size (708). Syntax data that indicates prediction data may include one or more values that indicate the particular prediction technique used by video encoder 20 to determine or other select a predictive sample for a partition. Syntax data that indicates residual data may include one or more values that indicate a difference between a depth value in a partition and a corresponding predictive sample of the prediction data. Syntax data that indicates the partitioning of the PU greater than 32×32 in size may include a value that indicates a particular partition pattern, an orientation of a partition pattern, and/or identifiers of one or more of the different partitions of a PU for a particular partition pattern.

In some examples, prediction processing unit 40 may provide DC residual value(s) for the depth PU greater than 32×32 in size, along with other syntax information, to entropy encoding unit 58. e.g., as illustrated by the dashed line in FIG. 5. Prediction processing unit 40 may provide the DC residual values to entropy encoding unit 58 without the values being processed by transform processing unit 44 and quantization unit 46. In other examples, quantization unit 46 may quantize the DC residual values prior to entropy coding by entropy encoding unit 58. The syntax information may include various information, flags, or other syntax elements described herein for signaling in association with the techniques of this disclosure.

For example, the syntax information may indicate, as examples, whether the SDC mode is performed for the depth block, whether a DMM mode or non-DMM mode was used to determine the DC residual value, and which depth intra prediction mode was used to determine the DC residual value. According to the SDC mode, video encoder 20 is configured to determine at least one DC residual value for the depth block (e.g., a partition of a PU of a CU) based on the indicated one of the depth intra prediction modes or depth inter prediction modes, wherein the DC residual value represents a residual value of a plurality of pixels of the depth block, and encode the DC residual value or information representing the DC residual value into the bitstream.

In some examples, prediction processing unit 40 may generate a Wedgelet partition pattern greater than 32×32 in size as an upsampled N×N partition pattern, where N=4, 8, 16 or 32. Prediction processing unit 40 may derive the N×N partition pattern in the same way as the current 3D-HEVC working draft, and the partition pattern greater than 32×32 in size is signaled in the same way as the N×N partition pattern. For instance, prediction processing unit 40 may select an existing N×N partition pattern from the pattern list and upsample the pattern to a PU greater than 32×32 in size.

To upsample the N×N partition pattern to greater than 32×32 in size, prediction processing unit 40 may determine the start and end points (xS, yS) and (xE, yE) for the N×N partition pattern. Prediction processing unit 40 may then apply an upscaling function f(x, y) to start and end points to generate upsampled start and end points (xS', yS') and (xE', yE'). Prediction processing unit 40 may use the upsampled start and end points to generate the N×N partition pattern for the PU greater than 32×32 in size. In this way, prediction processing unit 40 generates the Wedgelet partition pattern greater than 32×32 in size as an upsampled N×N partition pattern. In some examples, the upscaling function f(x,y), may apply one or more linear offset values to each of the x and y values. In other examples, the upsampling function f(x,y) may change the value of x and y in a non-linear manner. In some examples, when prediction processing unit 40 upsamples the partition pattern, prediction processing unit 40 may apply one or more pixel interpolation techniques and/or pixel decimation techniques.

When prediction processing unit 40 generates the wedgelet partition pattern greater than 32×32 in size with a N×N wedgelet pattern, prediction processing unit 40 selects an upsampled N×N wedgelet partition pattern from the N×N wedgelet pattern list of current 3D-HEVC. Prediction processing unit 40 signals the N×N wedgelet partition pattern using a wedgelet index value of the corresponding N×N partition pattern. Video decoder 30 may upsample the N×N partition pattern to derive the wedgelet partition pattern greater than 32×32 in size, and the wedgelet index value may be binarized by prediction processing unit 40 using a fixed-length code as the same as current 3D-HEVC.

Upon determining the N×N partition pattern that yields a determined coding efficiency, e.g., according to operations 700-706, prediction processing unit 40 may signal the N×N partition pattern, rather than a partition pattern greater than 32×32 in size, where N is less than 64. In some examples, a determined coding efficiency may be a best coding efficiency, as described in this disclosure. In some examples, a determined coding efficiency may be a coding efficiency that is more efficient relative to one or more other coding efficiencies associated with other partition patterns. In some examples, a determined coding efficiency may be a coding efficiency that satisfies a threshold. For instance, the determined coding efficiency may be the first coding efficiency for a partition tested in an order of a group of possible partitions.

Syntax data that indicates the N×N partition pattern may also include information that indicates video decoder 30 will upsample the N×N partition pattern to a pattern suitable for a PU greater than 32×32 in size. Using the same upscaling function f(x,y), video decoder 30, when decoding a PU greater than 32×32 in size, may upsample the N×N partition pattern that was signaled by video encoder 20. In this way, video encoder 20 and video decoder 30 may not have to store and/or signal wedgelet partition patterns for PUs greater than 32×32 in size, while still retaining the capability to apply Wedgelet partition pattern greater than 32×32 in size to a PU greater than 32×32 in size.

In some examples, prediction processing unit 40 may select the Wedgelet partition pattern greater than 32×32 in size from only the horizontal and/or vertical Wedgelet partition patterns greater than 32×32 in size (e.g., "horizontal partition pattern" and "vertical partition pattern"). Horizontal and vertical partitions may have as start and end points either the same horizontal coordinate or the same vertical coordinate. For instance, a horizontal partition may have a start point that is the same y coordinate value as the end point, but has different x coordinates for the start and end points. A vertical partition may have a start point that is the same x coordinate value as the end point, but has different y coordinates for the start and end points. Accordingly, in some examples, prediction processing unit 40, when generating one or more partitions of the depth PU greater than 32×32 in size (e.g., at operation 702), may use only horizontal and/or vertical Wedgelet partition patterns greater than 32×32 in size. For instance, prediction processing unit 40 may not use partition patterns that have different coordinate values in the both x and y dimensions as starting and ending points. In other words, for at least one dimension (e.g., x or y) the coordinate values must be the same for starting and ending points. By using only horizontal and/or vertical partition patterns greater than 32×32 in size, prediction processing unit 40 may reduce the overall number of partition patterns that video encoder 20 must process to determine the partition pattern that yields a determined coding efficiency (e.g., a best or first coding efficiency that satisfies a threshold), as described in this disclosure. In some examples, the start/end point accuracy for the horizontal/vertical partition pattern greater than 32×32 in size can be full-sample, two-sample, three-sample or four-sample. In some examples, the Wedgelet pattern greater than 32×32 in size is binarized by prediction processing unit 40 using fixed-length code with $\log_2 [C]$ bits, where the fixed-length code is the binary value representation of the given Wedgelet pattern index, and C indicates the total number of Wedgelet patterns greater than 32×32 in size.

In some examples, in addition to prediction processing unit 40 using DMM mode 1 for PU greater than 32×32 in size as described with respect to FIG. 7, prediction processing unit 40 may apply SDC, and therefore each partition of the PU greater than 32×32 in size may have just one DC residual value signaled. Instead of coding quantized transform coefficients, SDC modes represent a depth block with the following two types of information: (1) the type of partition of the current depth block, including DMM mode 1 (2 partitions) and Planar (1 partition), and (2) for each partition, a residual value (in the pixel domain) that is signaled in the bitstream. Therefore, prediction processing unit 40 may determine the type of partition pattern for the PU greater than 32×32 in size and a single residual value for each partition of the PU greater than 32×32 in size. In some examples, prediction processing unit 40 may apply a Wedgelet greater than 32×32 in size for only SDC, meaning each Wedgelet partition of the block greater than 32×32 in size is only coded with SDC. In other examples, prediction processing unit 40 may apply a Wedgelet greater than 32×32 in size only with DMM 1, and not with SDC. In still other examples, prediction processing unit 40 may apply a Wedgelet greater than 32×32 in size to partitions greater than 32×32 in size with both SDC on and off. In other words, rather than determining coding efficiency using DMM 1 only with SDC or determining coding efficiency using DMM 1 only without SDC, prediction processing unit 40 may determine the coding efficiencies of applying a Wedgelet greater than 32×32 in size to PUs greater than 32×32 in size (1) with DMM 1 and using SDC and (2) with DMM 1 without using SDC, and use these different modes for different PUs based on the coding efficiency results. When using SDC, a single residual value for each partition may provide better coding efficiency than determining and signaling residual data for each pixel value in the depth map.

Figure 8:
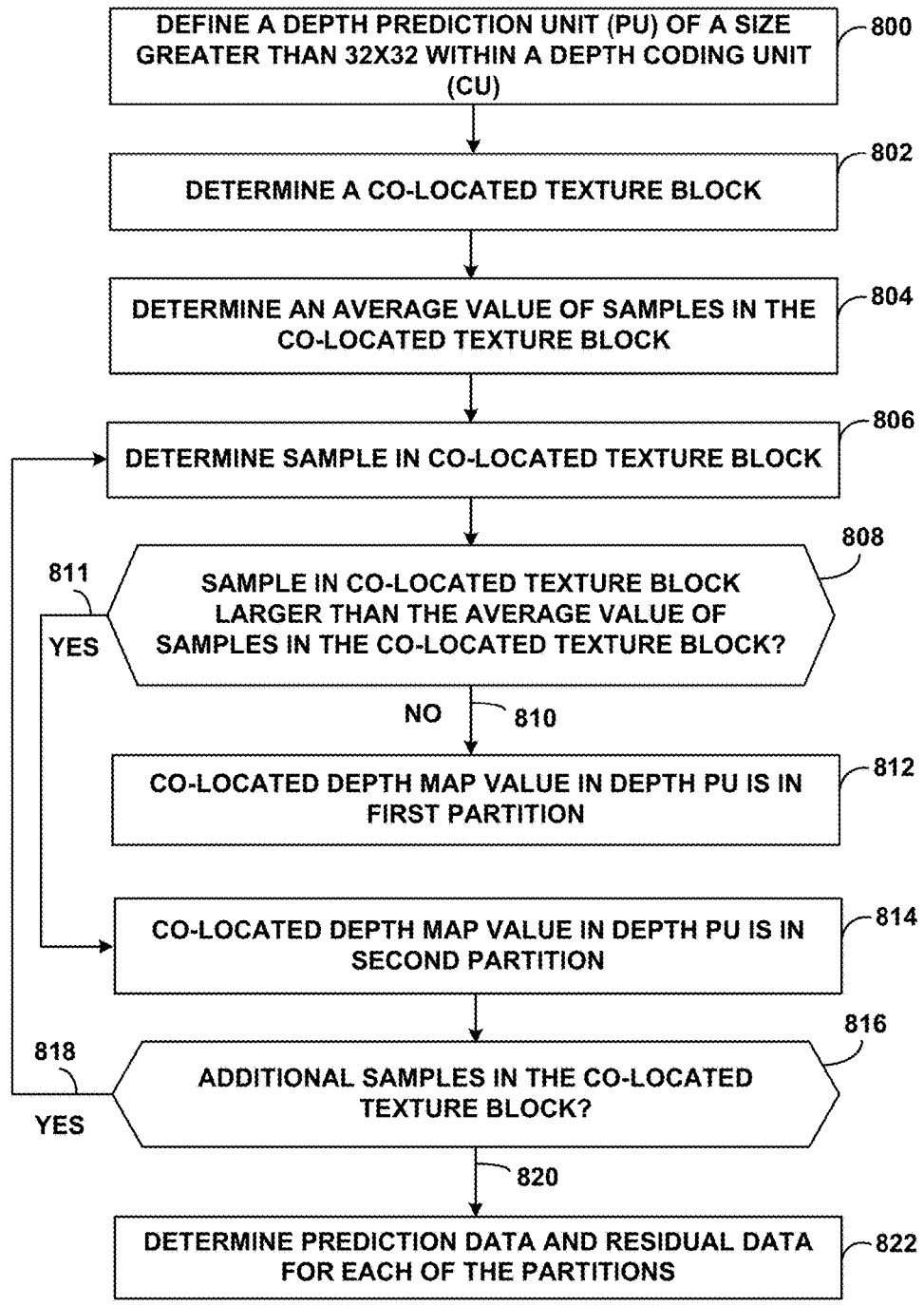
FIG. 8 is a flowchart illustrating an example method of encoding video data using DDM 4.

FIG. 8 is a flowchart illustrating an example method of coding video data using DMM 4. For purposes of illustration, the example operations are described below within the context of video encoder 20 and video decoder 30 in FIGS. 1, 5 and 6. In particular, FIG. 8 illustrates, in further detail, techniques of video encoder 20 and video decoder 30 that extend DMM mode 4 to depth PUs of a size greater than 32×32 for depth coding in 3D-HEVC. As further described below, for a PU greater than 32×32 in size, video encoder 20 and video decoder 30 may calculate an average value of all the samples in the texture block greater than 32×32 in size, and then video encoder 20 and video decoder 30 may derive the partition pattern greater than 32×32 in size according to whether the samples in the co-located texture block greater than 32×32 in size is larger (partition 1) or not equal to or larger (partition 0) than the average value. In some examples, a sample of a co-located texture block may include one or more luminance (brightness or "luma") values of an image and one or more chrominance (color or "chroma") values for a particular pixel of the texture block. In the example of FIG. 8, prediction processing unit 40 and prediction processing unit 82, respectively, perform texture encoding and depth encoding, although in other examples, different components within video encoder 20 and video decoder 30 may also perform one or more texture encoding and/or depth encoding techniques. In either case, video encoder 20 and video decoder 30 may be configured to intra- or inter-encode texture data and depth data as part of a 3D coding process, such as a 3D-HEVC process.

In accordance with techniques of the disclosure, video encoder 20 and video decoder 30 may receive a depth map and define a depth prediction unit (PU) greater than 32×32 in size within a depth coding unit (CU) (800). In some examples, to define the depth PU greater than 32×32 in size, video encoder 20 and video decoder 30 may define the depth PU greater than 32×32 in size using Depth Modeling Mode (DMM) 4. Using DMM 4, video encoder 20 and video decoder 30 may use a co-located texture block to determine a Wedgelet partition pattern greater than 32×32 in size. For example, prediction processing unit 40 may determine a co-located texture block from a texture picture (802). In some examples, the texture picture may be in the same access unit as the depth map that includes the PU greater than 32×32 in size. The location of the co-located texture block within the texture picture may correspond to the same relative location of the PU greater than 32×32 in size in the depth map. Video encoder 20 and video decoder 30 may therefore determine the location of the co-located texture block in the texture picture based on the location of the PU greater than 32×32 in size in the depth map.

Upon determining the co-located texture block, video encoder 20 and video decoder 30 may determine an average value of all the samples in the co-located texture block (804). In some examples, video encoder 20 and video decoder 30 may determine the mean of all the samples of the prediction samples in the co-located texture block. To determine the partition pattern greater than 32×32 in size, video encoder 20 and video decoder 30 may compare each sample of the co-located texture block to the average value of all samples of the co-located texture block. Based on the comparison, video encoder 20 and video decoder 30 may designate, to a particular partition of the partition pattern, a depth value that is co-located with the corresponding sample of the co-located texture block. In this way, each depth value of the depth map is assigned to a particular partition of the partition pattern based on the comparison of the texture sample that is co-located with the depth value. Accordingly, the partition pattern is defined by assigning each depth value to a particular partition based on the comparison of the sample in the texture block that is co-located with the depth value in the depth map.

As shown in FIG. 8, video encoder 20 and video decoder 30 determine each sample in the co-located texture block. For instance, video encoder 20 and video decoder 30 determine a sample in co-located texture block (806). Video encoder 20 and video decoder 30 compare the sample to the average of the samples to determine if the sample is larger or smaller than the average of the samples (808). If the sample in the co-located texture block is smaller than the average value (810), video encoder 20 and video decoder 30 may determine that the depth value co-located with the sample is included in a first partition (e.g., partition 0) of the PU greater than 32×32 in size (812). If the sample in the co-located texture block is larger than the average value (811), video encoder 20 and video decoder 30 determine that the depth value co-located with the sample is included in a second partition (e.g., partition 1) of the PU greater than 32×32 in size (814). In this way, the depth pixels may be partitioned in the same way as the co-located texture pixels. To indicate which partition the corresponding depth value is included in, video encoder 20 and video decoder 30 may store information that indicates, for the location of the corresponding depth value in the depth map, which partition includes the depth value.

Video encoder 20 and video decoder 30 may determine whether another sample exists in the co-located texture block that has not yet been compared to the average of samples (816). If another sample remains (818), video encoder 20 and video decoder 30 determine the sample and perform the techniques as described above with respect to operations 808, 810, 811, 812, 814, as appropriate for the particular sample. If all the samples in the co-located texture block have been compared to the average of samples in the co-located block (820), video decoder 30 may obtain prediction data and residual data for each of the partitions of the generated partition pattern (822) as described in the operations of FIG. 10. Using the prediction data and the residual data for each of the partitions, video decoder 30 may reconstruct each depth value of the depth PU greater than 32×32 in size.

In the case of video encoding, video encoder 20 may generate prediction data and residual data for each of the partitions of the generated partition pattern as described in the operations of FIG. 8 (822). In the case of video encoder 20, upon determining the partition pattern for the block size greater than 32×32 in size, video encoder 20 may generate syntax data that indicates the prediction data, the residual data, and/or the partitioning of the PU greater than 32×32 in size. Syntax data that indicates prediction data may include one or more values that indicate the particular prediction technique used by video encoder 20 to determine or other select a predictive sample for a partition. Syntax data that indicates residual data may include one or more values that indicate a difference between a depth value in a partition and a corresponding predictive sample of the prediction data. Syntax data that indicates the partitioning of the PU greater than 32×32 in size may include a value that indicates a particular partition pattern, an orientation of a partition pattern, and/or identifiers of one or more of the different partitions of a PU for a particular partition pattern.

In some examples, video encoder 20 and video decoder 30 calculates the average value of all the samples in the downsampled N×N block of the co-located texture block greater than 32×32 in size. Video encoder 20 and video decoder 30 may then derive the partition pattern greater than 32×32 in size according to whether the samples in the N×N block are larger (partition 1) or not larger (partition 0) than the average value, where N can equals to 4, 8, 16 or 32. For instance, video encoder 20 and video decoder 30 may downsample a co-located texture block greater than 32×32 in size to an N×N texture block. Video encoder 20 and video decoder 30 may calculate the average value of the samples in the N×N block. Upon calculating the average value, video encoder 20 and video decoder 30 may compare each sample of the co-located texture block to determine an N×N partition pattern, as described above with respect to a partition pattern greater than 32×32 in size in FIG. 8. Video encoder 20 and video decoder 30 may determine that the N×N partition pattern provides a determined coding efficiency (e.g., a best or first coding efficiency that satisfies a threshold) among different possible partition patterns and block sizes, and generates one or more syntax elements that indicate DMM 4 and the size of N×N. Accordingly, video encoder 20 and video decoder 30 may apply a partition pattern greater than 32×32 in size by upscaling the N×N partition pattern to greater than 32×32 in size and applying the partition pattern greater than 32×32 in size to reconstruct the PU greater than 32×32 in size.

In some examples, in addition to video encoder 20 and video decoder 30 using DMM mode 4 for PU greater than 32×32 in size as described with respect to FIG. 8, video encoder 20 and video decoder 30 may apply SDC, and therefore each partition of the PU greater than 32×32 in size may have just one DC residual value signaled and used for decoding. Instead of coding quantized transform coefficients, SDC modes represent a depth block with the following two types of information: (1) the type of partition of the current depth block, including DMM mode 1 (2 partitions) and Planar (1 partition), and (2) for each partition, a residual value (in the pixel domain) that is signaled in the bitstream. Therefore, video encoder 20 and video decoder 30 may determine the type of partition pattern for the PU greater than 32×32 in size and a single residual value for each partition of the PU greater than 32×32 in size. In some examples, video encoder 20 and video decoder 30 may apply a Contour partition pattern greater than 32×32 in size for only SDC, meaning each Contour partition of the block greater than 32×32 in size is only coded with SDC. In other examples, video encoder 20 and video decoder 30 may apply a Contour partition pattern greater than 32×32 in size only with DMM 4, and not with SDC. In still other examples, video encoder 20 and video decoder 30 may apply a Contour partition pattern greater than 32×32 in size to partitions greater than 32×32 in size with both SDC on and off. In other words, rather than determining coding efficiency using DMM 4 only with SDC or determining coding efficiency using DMM 4 only without SDC, video encoder 20 and video decoder 30 may determine the coding efficiencies of applying a Contour partition pattern greater than 32×32 in size to partitions greater than 32×32 in size (1) with DMM 4 and using SDC and (2) with DMM 4 without using SDC. When using SDC, a single residual value for each partition may provide better coding efficiency than determining and signaling residual data for each value in the depth map.

FIGS. 9A and 9B are conceptual diagrams illustrating the generation and signaling of a Wedgelet partition pattern for a depth PU of a size greater than 32×32 using a Wedgelet extension technique in which the partition pattern is generated by extending a 4×4 Wedgelet pattern at a given position. For example, FIGS. 9A and 9B illustrate mapping from 2N×2N partition pattern samples to N×N partition pattern samples (e.g., for half-sample accuracy). Techniques of FIGS. 9A and 9B are described with respect to video encoder 20 and video decoder 30. FIG. 9A illustrates the example of orientation 0, where the start point is on the top row and the end point is on the left column. FIG. 9B illustrates the example of orientation 1, where the start point is on the right column and the end point is on the top row.

In FIGS. 9A and 9B, the shaded blocks indicate the samples of the downsampled N×N partition pattern. For example, the block in FIGS. 9A and 9B may be 2N×2N in size, and, in FIGS. 9A and 9B, the shaded samples indicate every other sample in the 2N×2N block, resulting in N×N blocks.

In some examples, to generate Wedgelet patterns with orientation 0, video encoder 20 and video decoder 30 may loop the start point ((xS, yS)) from (0, 0) to (2N−1, 0), and loop the end point ((xE, yE)) from (0, 0) to (0, 2N−1) to cover all possible start and end points for the Wedgelet patterns with orientation 0. Video encoder 20 and video decoder 30 may also map (i, j) to (m, n), where m=2i and n=2j, for orientation 0. For the case of orientation 1, video encoder 20 and video decoder 30 may loop the start point ((xS, yS)) from (2N−1, 0) to (2N−1, 2N−1), and loop the end point ((xE, yE)) from (2N−1, 0) to (0, 0) to cover all possible start and end points for Wedgelet patterns with orientation 1. Video encoder 20 and video decoder 30 may also map (i, j) to (m, n), where m=2i+ and n=2j, for orientation 1.

For other orientation cases, video encoder 20 and video decoder 30 may similarly loop the start and end points based on the orientations. The equation for mapping for all orientations may be generalized as m=2i+offsetX and n=2j+offsetY, where offsetX, offsetY are shifting values as specified in Table 4 below. Video encoder 20 and video decoder 30 may implement the equation m=2i+offsetX and n=2j+offsetY for the mapping for each of the orientations, where offsetX and offsetY are defined by Table 4.

TABLE 4

Setting of offsetX and offsetY based on the orientation of the partition boundary line

| Orientation | offsetX | offsetY |
|---|---|---|
| 0 | 0 | 0 |
| 1 | 1 | 0 |
| 2 | 1 | 1 |
| 3 | 0 | 1 |
| 4 | xS + xE < K ? 0: 1 | 0 |
| 5 | 0 | yS + yE < K ? 0: 1 |

In accordance with techniques of the disclosure, there may be benefits associated with Wedgelet pattern based intra-prediction for blocks greater than 32×32 in size (e.g., 64×64), and existing techniques may not support such intra-prediction based on Wedgelet pattern for blocks greater than 32×32, such as 64×64 sized. The following examples of FIGS. 9A and 9B describe techniques for simplified depth partition pattern generation for depth intra coding. The following example techniques may be performed by video encoder 20 and video decoder 30. For example, video encoder 20 and/or video decoder 30 may intra-code depth data (i.e., intra-prediction encode or intra-prediction decode, respectively). Also, the example techniques may be performed separately or one or more techniques may be performed in combination.

In the techniques described in FIGS. 9A-9B, the Wedgelet pattern for the larger sized depth block may be determined from a Wedgelet pattern for smaller sized blocks. In this way, video encoder 20 and video decoder 30 may store the Wedgelet patterns (e.g., partition patterns) for smaller sized blocks and store fewer or no Wedgelet patterns for larger sized blocks because video encoder 20 and video decoder 30 may determine the Wedgelet pattern for the larger sized depth block from a Wedgelet pattern of Wedgelet patterns for smaller sized blocks.

As an example, video encoder 20 and video decoder 30 may be configured to construct a partition pattern list (e.g., Wedgelet pattern list) for blocks of a first block size. The partition pattern list may include one or more partition patterns associated with blocks of the first block size. For intra-prediction encoding of a depth block of a second block size, larger than the first block size, video encoder 20 may intra-prediction encode the depth block of the second size using a partition pattern (e.g., a Wedgelet pattern) determined from the partition patterns for blocks of the first block size. In other words, video encoder 20 may intra-prediction encode the depth block of the second size using a partition pattern associated with blocks of the first size. For depth modeling mode (DMM) 1, video encoder 20 may signal an index into the partition pattern list that includes the one or more partition patterns associated blocks of the first block size.

For intra-prediction decoding of the depth block of the second block size, video decoder 30 may receive the index into the partition pattern list that includes one or more partition patters associated with blocks of the first block size, and may determine a partition pattern associated with blocks of the first size from the index. Again, the partition pattern is associated with blocks of a first block size that is smaller than the second block size of the depth block being decoded. Video decoder 30 may then determine a partition pattern for the depth block of the second block size from the determined partition pattern. Video decoder 30 may intra-prediction decode the depth block of the second size based on the determined partition pattern.

By determining the partition pattern for a block greater than 32×32 in size based on a partition pattern from partition patterns for smaller sized blocks, the number of partition patterns that need to be stored for larger sized blocks may be reduced. For instance, in the previous example, video encoder 20 and video decoder 30 may construct partition pattern list that includes one or more partition patterns associated with blocks of the first block size, and use one of the partition patterns from the partition pattern list to determine the partition pattern for a depth block of a second, larger size that is greater than 32×32 (e.g., 64×64). Accordingly, the number of partition patterns stored in the partition pattern list may be reduced because one or more of the partition patterns greater than 32×32 in size can be determined from partition patterns for smaller blocks sizes.

In some examples, video encoder 20 and video decoder 30 may not even construct partition list patterns for blocks greater than 32×32 in size. In such examples, video encoder 20 and video decoder 30 may rely on partition patterns associated with smaller sized blocks to determine the partition patterns for depth blocks greater than 32×32 in size, such as 64×64. As described above, by determining a partition pattern for a depth block of a size greater than 32×32 based on a partition pattern for a smaller sized block, the techniques described in this disclosure may reduce memory requirements and reduce complexity. In some examples, the smaller sized block may be a block within the larger sized depth block. However, the techniques described in this disclosure are not so limited. In some examples, the smaller sized block need not necessarily be an actual block that is being intra-prediction encoded or decoded. Rather, the smaller sized block may be conceptual block whose partition patterns are used to determine a partition pattern for a larger sized block.

As one example, assume that the depth block being intra-prediction encoded or decoded is a 64×64 sized depth block. In this example, video encoder 20 may signal an index into a partition pattern list for blocks of size 16×16. Video decoder 30 may receive the index into the partition pattern list for blocks of size 16×16 and determine the partition pattern from partition patterns for blocks of size 16×16. In this example, both video encoder 20 and video decoder 30 may be configured to determine the partition pattern for the 64×64 sized depth block from the determined partition pattern for blocks of size 16×16. As one example, video encoder 20 and video decoder 30 may upsample the determined partition pattern for blocks of size 16×16 to determine the partition pattern for the 64×64 sized depth block.

Although the smaller sized block, whose partition pattern list video encoder 20 and video decoder 30 use to determine the partition pattern for the 64×64 sized block, does not need to be part of the 64×64 sized block, the techniques described in this disclosure are described with examples where the smaller sized block is a block within the 64×64 sized block. For example, in one example for depth coding (e.g., intra-prediction coding of a depth block), the partition patterns are independent of block sizes.

It should be understood that in the techniques described in this disclosure video encoder 20 and video decoder 30 may determine a partition pattern for a smaller sized block as an intermediate step for determining a partition pattern for a 64×64 sized block. For example, the smaller sized block may not be intra-prediction encoded or decoded based on the smaller sized block's partition pattern. Rather, the smaller sized block may be intra-prediction encoded or decoded as part of the intra-prediction of the larger 64×64 sized block.

As an example, assume that the current depth block (e.g., the current depth PU) has a size of N×N. In this example, the current depth block includes an integer number of M×M (where M<N) blocks. In some examples, the M×M block may be a sub-PU. As an example, if the current depth block (e.g., the depth block to be intra-prediction encoded or decoded) is a 64×64 sized block, there are sixteen 16×16 sized blocks within the 64×64 sized block, or two-hundred and fifty-six 4×4 sized blocks within the 64×64 sized block.

In some examples, video encoder 20 may signal information identifying one specific M×M block (e.g., where M equals 4) and a line-based partition pattern (e.g., a Wedgelet pattern that defines a linear line that bisects the M×M block into two partitions). Video decoder 30 may receive the information identifying the M×M block and the line-based partition pattern. Based on the line-based partition pattern of the specific M×M block, video encoder 20 and video decoder 30 may determine (e.g., derive) the line-based partition for the whole N×N PU. In other words, based on the partition pattern for an M×M block, video encoder 20 and video decoder 30 may determine a partition pattern for the entire N×N depth block, where the N×N depth block includes the M×M block, where M is less than N.

In one example, the line-based partition pattern can be a Wedgelet pattern of DMM 1 applied to the specific M×M block as in current 3D-HEVC. For example, video encoder 20 may signal information indicating that the depth modeling mode (DMM) is 1, signal information identifying an M×M block within the N×N block, and signal information used to identify the partition pattern for the M×M block (e.g., an index value into a partition pattern list for blocks of size M×M). Video decoder 30 may receive information indicating that the DMM is 1, determine the M×M block within the N×N block based on the received information identifying the M×M block, and determine the partition pattern for the M×M block (e.g., based on the index value into the partition pattern list for blocks of size M×M). Video decoder 30 may then determine the partition pattern for a whole N×N block based on the determined partition pattern for the M×M block.

As described herein, a "whole" block may include the entire block, including any sub-blocks that may be included in the block. Accordingly, for a block having four sub-blocks, the whole block may refer to the entire block including all of the four sub-blocks.

For example, video encoder 20 may determine a line-based partition pattern for a sub-block (e.g., a Wedgelet pattern that defines a linear line that bisects an M×M block into two partitions) of a block (e.g., an N×N block that is a depth PU) for intra depth encoding (intra-prediction encoding), wherein the sub-block is smaller than the block. In some examples, video encoder 20 may determine the line-based partition pattern for the sub-block of the block without basing the determined line-based partition pattern on a size of the block (i.e., independent of the block size). Video encoder 20 may determine a line-based partition pattern for the block based on the line-based partition pattern for the sub-block. Video encoder 20 may intra-encode (intra-prediction encode) the block based on the determined line-based partition pattern for the block. Video encoder 20 may signal information indicating the line-based partition pattern for the sub-block (e.g., encode information indicating the line-based partition pattern for the sub-block). In some examples, video encoder 20 may signal information used to identify the sub-block within the block whose line-based partition pattern video encoder 20 determined; however, this is not required in every example.

Video encoder 20 may not signal information indicating the line-based partition pattern for the block. For example, video encoder 20 may avoid the encoding or not encode information indicating the line-based partition pattern for the block. Rather, video encoder 20 may signal information indicating the line-based partition pattern for the sub-block.

Video decoder 30 may receive information indicating a line-based partition pattern for a sub-block (e.g., decode information indicating a line-based partition pattern for a sub-block) of a block for intra depth decoding (e.g., for intra-prediction decoding). Video decoder 30 may determine a line-based partition pattern for the block based on the line-based partition pattern for the sub-block. Video decoder 30 may intra-decode (intra-prediction decode) the block based on the determined line-based partition pattern for the block. In some examples, video decoder 30 may receive information used to identify the sub-block within the block whose line-based partition pattern was received by video decoder 30; however, this is not required in every example. Video decoder 30 may determine the line-based partition pattern for the block without receiving information indicating the line-based partition pattern for the block. Rather, video decoder 30 may determine the line-based partition pattern from the sub-block. Also, video decoder 30 may determine the line-based partition pattern for the block without basing the determined line-based partition pattern on a size of the block (i.e., independent of the block size).

It should be understood that the M×M sub-block need not necessarily be a block that fits within a larger N×N block. Rather, the M×M sub-block may be a conceptual block whose line-based partition patterns are used for purposes of determining a line-based partition pattern for the N×N block. In other words, in the above example, video encoder 20 may determine a partition pattern (e.g., a line-based partition pattern like Wedgelet patterns) for a depth block of a first size (e.g., 64×64) based on a partition pattern for a block of a second, smaller size (e.g., 16×16 or 32×32). Video encoder 20 may intra-prediction encode the depth block based on the determined partition pattern. Video decoder 30 may similarly determine a partition pattern for a depth block of a first size (e.g., 64×64) based on a partition pattern for blocks of a second, smaller size (e.g., 16×16 or 32×32). Again, this smaller sized block does not need to be an actual block in the picture or within the depth block, but is instead a conceptual block whose partition patterns are used to determine a partition pattern for a larger block.

In some examples, video encoder 20 signals information identifying the partition pattern for blocks of the second size (e.g., 16×16), and video decoder 30 determines the partition pattern for blocks of the second size based on the signaled information. For example, video encoder 20 may signal an index to a partition pattern list for partition patterns of the second size, where the partition pattern identified by the index is the partition pattern that video encoder 20 utilized to determine the partition pattern for the depth block of the first size. Video decoder 30 may receive the index into the partition pattern list for partition patterns of the second size, and determine the partition pattern for the depth block of the first size (e.g., 64×64) based on the partition pattern for blocks of the second size, wherein the second size is smaller than the first size.

In the above examples, the smaller sized block is a conceptual block and not necessarily a block of the picture that includes the depth block, or a block within the depth block. However, in some examples, the smaller block may be a block within the larger sized block. In examples where the smaller sized block is a block within the larger sized block (e.g., the 16×16 block is one of the sixteen 16×16 blocks within the 64×64 block), video encoder 20 may signal information identifying the location of the smaller sized block in the larger sized block. Video decoder 30 may then determine the partition pattern for the larger 64×64 sized block based on the partition pattern for the smaller sized block and the position of the smaller sized block within the larger sized 64×64 block. For instance, video decoder 30 may extend the linear line that bisects the smaller sized block outward until the linear line encounters edges of the larger sized 64×64 block. The resulting bisection of the larger sized 64×64 block may be the partition pattern for the larger sized block determined from the partition pattern of the smaller sized block.

In other words, video decoder 30 may extend a linear line of the partition pattern for the sub-block to boundaries of the depth block. The resulting linear line may be the partition pattern for the depth block used to intra-prediction decode the depth block. Video encoder 20 may similarly extend a linear line of the partition pattern for the sub-block to boundaries of the depth block, and the resulting linear line may be the partition for the depth block used to intra-prediction encode the depth block.

In some examples, video encoder 20 may not need to signal information identifying the position of the smaller sized block. In such examples, video decoder 30 may be pre-configured to use a set smaller sized block as the block from which video decoder 30 extends the partition pattern to determine the partition pattern for the larger sized 64×64 depth block. In some examples the set smaller sized block may be a fixed size. The fixed size may be predetermined before coding and/or set by a designer of the video coder.

For example, video encoder 20 may signal the index of the specific M×M (e.g., 16×16) block (i.e., sub-block), which video decoder 30 receives, with a relative horizontal and vertical index (i, j), with i and j in the range of 0 to N/M−1, inclusive. In this example, the top-left position of M×M block is (M*i, N*j). In this manner, video decoder 30 may determine the position of the M×M block, and further determine the partition pattern for the whole N×N (e.g., 64×64) block by extending the linear line, as described in more detail below.

Video encoder 20 and video decoder 30 may encode or decode, respectively, the position (i, j) of the M×M block with either by-pass mode or context modeling. In other words, video encoder 20 may encode the position (i, j) using by-pass mode or context modeling for identifying the sub-block whose line-based partition pattern was determined, and video decoder 30 may decode the position (i, j) using by-pass mode or context modeling to identify the sub-block whose line-based partition pattern was received.

Alternatively or additionally, video encoder 20 and video decoder 30 may be pre-configured to set the specific M×M block to always start at either the left boundary M×M block or the bottom boundary M×M block of the current PU. In this case, video encoder 20 may signal a flag and only one offset is further signaled by the encoder. For instance, in this example, video encoder 20 may signal a flag and one offset for identifying the sub-block whose line-based partition pattern was determined, and video decoder 30 may receive a flag and one offset to identify the sub-block whose line-based partition pattern was received.

In some cases, instead of signaling the horizontal and vertical index in M×M unit within one N×N block, video encoder 20 may identify the M×M block by a quad-tree structure, wherein each level representation has zero or more "0s" and one "1" and terminates and proceeds to a lower level once a "1" is reached. In this example, video encoder 20 may not need to signal information for identifying the sub-block and video decoder 30 may not need to receive information to identify the sub-block. For instance, video decoder 30 may similarly use the quad-tree structure to determine the M×M block for which video decoder 30 determined a partition pattern for determining the partition pattern for the N×N depth block.

In some examples, video encoder 20 and video decoder 30 may extend the line-based partition pattern of the specific M×M (e.g., 16×16) block to a larger N×N (e.g., 64×64) block in a way that the partition patterns of all M×M blocks inside the N×N block, if available, together form a line-based partition for the whole PU (i.e., whole depth block). For example, at the top-right corner of a particular M×M block is the bottom-left corner of another M×M block within an N×N block. In some examples, video encoder 20 and video decoder 30 may extend the linear line (e.g., partition line) that bisects a particular M×M block through the other block connected to the top-right corner of the particular M×M block. Similarly, at the bottom-left corner of the particular M×M block is the top-right corner of yet another M×M block within the N×N block. In some examples, video encoder 20 and video decoder 30 may extend the linear line (e.g., partition line) that bisects a particular M×M block through the other block connected to the bottom-left corner of the particular M×M block. In this way, video encoder 20 and video decoder 30 may extend the line-based partition of a specific M×M block to the whole PU.

As described above, video encoder 20 and video decoder 30 may be configured to extend the linear line that bisects the smaller sized block such that the linear line bisects the larger sized block for determining the partition pattern for the larger sized depth block. In some examples, to extend the specific M×M line-based partition pattern to the current PU (i.e., to the whole larger sized depth block), video encoder 20 and video decoder 30 may first derive the partition boundary line function y=a*x+b, by determining (M*i, M*j) and the start and end point positions of the M×M partition pattern, where a and b represent the slope and the intercept, respectively, of the partition boundary line. In other words, video encoder 20 and video decoder 30 may determine the line-equation of the linear line based on the slope-line formula. With the partition boundary line function, video encoder 20 and video decoder 30 may derive an N×N partition pattern (referred to as bPattern), which is an N×N binary block, as bPattern[x][y]=(y−a*x)<b?1:0, where x, y=0, 1, . . . N−1. In one example, furthermore, a and b are rounded to integers.

When DMM mode 3 or 4 is enabled, a specific M×M block may be signaled by video encoder 20 and received by video decoder 30. In addition, inside the M×M block, video encoder 20 signals the line-based partition pattern (e.g., the Wedgelet pattern) in a way similar to how video encoder 20 signals the Wedgelet pattern in DMM mode 3 for an M×M PU (i.e., M×M block) as in the current 3D-HEVC. In this case, video encoder 20 may signal a Wedgelet sub-set index relative to an M×M PU (i.e., M×M block).

As described above, with the techniques described in FIGS. 9A-9B, there may be a reduction in the number of partition patterns that are needed for larger sized blocks, such as, e.g., 64×64 blocks or larger blocks. For example, in the techniques described in this disclosure, only up to N/M (or 2×N/M) M×M blocks may need a partition (i.e., video encoder 20 and video decoder 30 may need to construct partition lists that include only up to N/M (or 2×N/M) M×M blocks). Accordingly, video encoder 20 may only need to signal partition patterns for up to N/M (or 2×N/M) M×M blocks, and derive or extend a partition pattern up to N/M (or 2×N/M) M×M blocks. Similarly, video decoder 30 may only need to receive partition patterns for up to N/M (or 2×N/M) M×M blocks, and derive or extend a partition pattern up to N/M (or 2×N/M) M×M blocks.

Furthermore, as described above, the techniques described in FIGS. 9A-9B may reduce the number of partition patterns that need to be stored and reduce the complexity of implementing intra-prediction using partition patterns. Accordingly, the techniques may overcome the issues with supporting line-based partitioning (e.g., Wedgelet partitioning) for 64×64 sized depth blocks or larger depth blocks. In other words, instead of supporting only up to a 32×32 line-based partition as in the current 3D-HEVC, using the techniques described in this disclosure, the Wedgelet pattern is extended to an N×N PU, which may be 64×64 or larger.

In addition to describing techniques for using line-based partition patterns for N×N sized depth blocks of size N=64, the techniques of FIGS. 9A-9B may increase the efficiency of implementing intra-prediction encoding and decoding for line-based partitioning (e.g., Wedgelet partitioning). For example, at video encoder 20, to accelerate the Wedgelet searching process for a N×N depth PU (i.e., depth block) in DMM 1, when the top-left, top-right, bottom-left and bottom-right samples of the current depth PU (i.e., depth block) in the original depth picture have the same value, video encoder 20 may skip the Wedgelet pattern searching process and video encoder 20 may be configured to not select DMM 1 for the current PU (i.e., current depth block).

As another example, alternatively or additionally, video encoder 20 may check values of multiple neighboring current depth PUs. Video encoder 20 may determine whether the searching process is skipped, and may select DMM 1 for current PU based on the determination. Alternatively or additionally, video encoder 20 may skip the Wedgelet pattern searching and select a one-sample partition pattern (e.g., the top-left sample belongs to a different partition of all other samples) when the top-left, top-right, bottom-left and bottom-right samples of the current depth PU in the original depth picture have the same value.

In some examples, in DMM 3 mode, if the N×N Wedgelet subset specified by the co-located texture luma intra mode is empty, video encoder 20 may skip the DMM 3 mode for current PU. The co-located texture luma intra mode being empty means that the luma component of the co-located texture block is not intra-prediction encoded or decoded. For example, if the luma component of the co-located texture block is inter prediction coded, there is no available luma intra mode. Alternatively or additionally, video decoder 30 may be constrained in a way that if the N×N Wedgelet subset specified by the co-located texture luma intra mode is empty, the DMM mode index decoded by the video decoder 30 can never be DMM 3 mode for the current PU.

As described above, for DMM 3, video encoder 20 and video decoder 30 may determine the partition pattern for the depth block based on the co-located texture block. However, the techniques described in this disclosure are not so limited. In some examples, in DMM 3 mode, video encoder 20 and video decoder 30 may not derive the Wedgelet partition pattern by the luma block that is co-located with the current N×N PU. Rather, video encoder 20 and video decoder 30 may determine the line-based partition pattern by the luma block that is co-located with the current M×M block.

For a Wedgelet pattern using half-sample accuracy of start/end point positions of an N×N PU, video encoder 20 and video decoder 30 may determine to which partition the position (m, n) belongs based on the partition to which the decision position (2m, 2n) belongs in an 2N×2N PU with the corresponding Wedgelet pattern. Video encoder 20 and video decoder 30 may determine to which partition the position (m, n) belongs without shifting the decision position (2m, 2n) in the 2N×2N block, with an offset vector of (offsetX, offsetY), wherein offsetX or offsetY is equal to 0 or 1 and depending on various conditions as in current 3D-HEVC.

Figure 10:
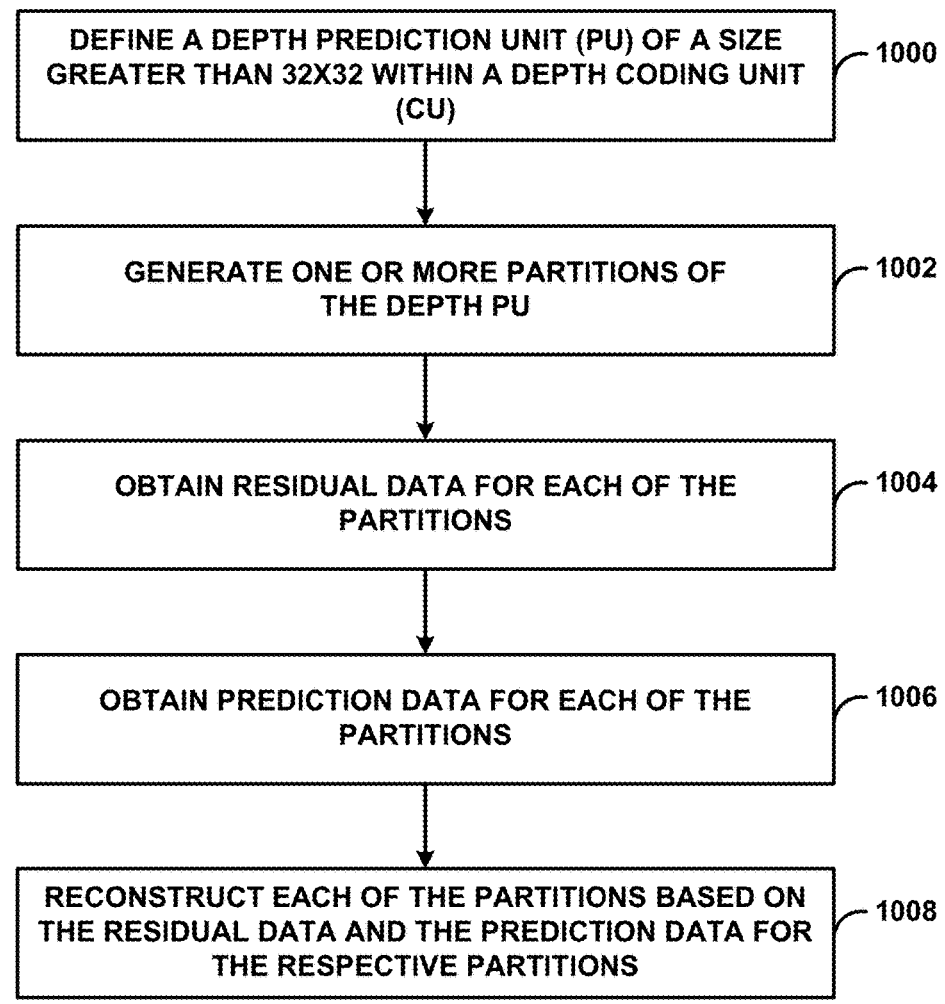
FIG. 10 is a flowchart illustrating an example method of decoding video data.

FIG. 10 is a flowchart illustrating an example method of decoding video data. For purposes of illustration, the example operations are described below within the context of video decoder 30 in FIGS. 1 and 6. In particular, FIG. 10 illustrates techniques of video decoder 30 that extend DMM modes, including DMM mode 1 and/or DMM mode 4 and any other depth modeling modes, to PUs of a size greater than 32×32 for depth coding in 3D-HEVC. In the example of FIG. 10, prediction processing unit 82 performs texture decoding and depth decoding, although in other examples, different components within video encoder 20 may also perform one or more texture decoding and/or depth decoding techniques. In either case, prediction processing unit 82 may be configured to intra- or inter-encode texture data and depth data as part of a 3D coding process, such as a 3D-HEVC process.

In accordance with techniques of the disclosure, prediction processing unit 82 receives syntax data that may indicate prediction data, residual data, and/or the partitioning of a PU greater than 32×32 in size. In some examples, encoded video data may refer to syntax data. Prediction processing unit 82 may receive encoded video data generated by video encoder 20. The encoded video data may represent a sequence of access units, where each access unit includes encoded data corresponding to a particular temporal instance. As described in FIG. 7, syntax data may include prediction data that indicates the particular prediction technique used by video encoder 20 to determine or otherwise select a predictive sample for a partition. Syntax data that indicates residual data may include one or more values that indicate a difference between a depth value in a partition and a corresponding predictive sample of the prediction data. Syntax data that indicates the partitioning of the PU greater than 32×32 in size may include a value that indicates a particular partition pattern, an orientation of a partition pattern, and/or identifiers of one or more of the different partitions of a PU for a particular partition pattern In the decoding process, prediction processing unit 82 may determine information from the syntax data that defines a depth prediction unit (PU) greater than 32×32 in size within a depth coding unit (CU) (1000). In some examples, to define the depth PU greater than 32×32 in size, prediction processing unit 82 may define the depth PU greater than 32×32 in size using Depth Modeling Mode (DMM) 1. In some examples, to produce a Wedgelet partition pattern greater than 32×32 in size, prediction processing unit 82 may select a Wedgelet partition pattern greater than 32×32 in size from a pre-defined 64×64 Wedgelet pattern list for the current PU. Prediction processing unit 82 may select the list based on a Wedgelet index value that was received by video decoder 30 as syntax data. The Wedgelet partition pattern greater than 32×32 in size that is received by video decoder 30 may be the partition pattern that provides a determined coding efficiency (e.g., a best or first coding efficiency that satisfies a threshold) among each of the partition patterns in the pre-defined pattern list that includes Wedgelet partition patterns greater than 32×32 in size. For instance, prediction processing unit 82 may store a pattern list that includes, but is not limited to, multiple, different pre-defined Wedgelet partition patterns greater than 32×32 in size.

Each Wedgelet partition pattern may be mapped in the pattern list to a particular identifier or index value that identifies the partition pattern. Prediction processing unit 82 may receive syntax data from video encoder 20 that indicates the pre-defined Wedgelet pattern list. Partition patterns of the pattern list are determined by connecting all possible start and end point positions with a specified start/end point resolution of half-sample, full-sample, two samples, three samples or four samples. In some examples, the pre-defined wedgelet pattern list of patterns greater than 32×32 in size is generated in the same way as other PU sizes ranging from 4×4 to 32×32, by connecting all possible start and end point positions with a specified start/end point resolution of half-sample, full-sample, two samples, three samples or four samples, to name only a few examples. Accordingly, in some examples, prediction processing unit 82 may receive syntax data indicating and/or generate the Wedgelet partition pattern greater than 32×32 in size and/or the DC prediction process in a similar way to other PU sizes ranging from 4×4 to 32×32 of 3D-HEVC.

Prediction processing unit 82 may generate one or more partitions of the depth PU greater than 32×32 in size (1002). The generated partitions may be based on partition patterns included in the wedgelet pattern list. As previously described in FIGS. 3A-3B, video decoder 30 may generate an N×N Wedgelet partition pattern, given a start point (xS, yS) and an end point (xE, yE) position, which could be signaled or could be retrieved from memory with a signaled index. Initially, prediction processing unit 82 may first generate a temporary K×K partition pattern with all samples initialized as 0. Prediction processing unit 82 may set the samples which form the partition boundary line connecting (xS, yS) and (xE, yE) as 1, and divide the temporary partition pattern as two parts (e.g., part A and part B as illustrated in FIGS. 4A-4F). After prediction processing unit 82 divides the temporary partition pattern as two partitions, prediction processing unit 82 may select one of the two parts to be partition 1 and the remaining part to be partition 2. Prediction processing unit 82 may be configured to select which of the parts is partition 1 based on the orientation of the Wedgelet pattern boundary line as described in FIGS. 4A-4F.

Prediction processing unit 82 may obtain residual data for each of the partitions of the signaled Wedgelet partition pattern (1004). In some examples, video decoder 30 may receive syntax data that includes residual values that correspond to respective depth values of the depth map. When reconstructing each depth value in a partition of a PU greater than 32×32 in size, prediction processing unit 82 may obtain the residual value that corresponds to each depth value.

Prediction processing unit 82 may obtain prediction data for each of the partitions (1006). As described in FIG. 7, prediction data may be one or more values determined or otherwise selected by video encoder 20 to generate residual data usable by video decoder 30 to reconstruct video data. In some examples, prediction data may be a pixel specific predictive sample, an average value, or a single value, to name only a few examples. In the case of a single value, the video coder may use the same value for all pixels. For HEVC intra prediction modes, prediction processing unit 82 may generate, based on syntax data received by video encoder 20, a pixel specific predictive sample for each pixel in the PU by using neighboring samples of the PU, e.g., as specified in sub-clause 8.4.2 in HEVC working draft. For partition based Intra prediction modes, e.g., DMM modes, which are applied for the depth Intra coding in 3D-HEVC, up to two neighboring reference samples may be selected for each partition according to the give partition pattern. Then for each partition, the average value of the selected two neighboring reference samples, or the value of the selected one neighboring reference sample may be assigned as the prediction value for the current partition.

In some examples, prediction processing unit 82 may use a different prediction technique for each partition based on syntax data received from video encoder 20. For instance, prediction processing unit 82 may, based on the syntax data, use a first, particular prediction technique (e.g., a first intra-prediction mode) to select or otherwise determine predictive samples for a first partition of the PU, and may use, based on the syntax data, a second, different prediction technique (e.g., a second intra-prediction mode) to select or otherwise determine predictive samples for a second partition of the PU. In some examples, prediction processing unit 82 may use, based on the syntax data, the same prediction technique for each partition to select or otherwise determine predictive samples for the partitions of the PU.

Upon determining the residual data and the predictive samples for depth values in the PU greater than 32×32 in size, video encoder 20 may reconstruct each partition of the PU (1008). Reconstruction unit 88 may use the residual data for a particular depth value and a corresponding predictive sample to reconstruct a depth value of a partition. For instance, reconstruction unit 88 may reconstruct a depth value that is each equal to a sum of a residual value and a corresponding predictive sample of the prediction data. For each depth value in a partition of a PU greater than 32×32 in size, reconstruction unit 88 may therefore reconstruct respective depth values by summing the respective residual value and its corresponding, respective predictive sample.

In some examples, prediction processing unit 82 may generate a Wedgelet partition pattern greater than 32×32 in size as an upsampled N×N partition pattern, where N=4, 8, 16 or 32. Prediction processing unit 82 may derive the N×N partition pattern based on syntax data that indicates an N×N partition pattern and information that indicates the N×N partition pattern will be upsampled to greater than 32×32 in size. For instance, based on the syntax data specifying the N×N partition pattern and the information to upsample the N×N partition pattern, prediction processing unit 82 may select the existing N×N partition pattern from the pattern list and upsample the pattern to a PU greater than 32×32 in size.

To upsample the N×N partition pattern to greater than 32×32 in size, prediction processing unit 82 may determine the start and end points (xS, yS) and (xE, yE) for the N×N partition pattern. Prediction processing unit 82 may then apply an upscaling function f(x, y) to start and end points to generate upsampled start and end points (xS', yS') and (xE', yE'). Prediction processing unit 82 may use the upsampled start and end points to generate the N×N partition pattern for the PU greater than 32×32 in size. In this way, prediction processing unit 82 generates the Wedgelet partition pattern greater than 32×32 in size as an upsampled N×N partition pattern. In some examples, the upscaling function, f(x,y), may apply one or more linear offset values to each of the x and y values. In other examples, the upscaling function f(x,y) may change the value of x and y in a non-linear manner. In some examples, when prediction processing unit 82 upsamples the partition pattern, prediction processing unit 82 may apply one or more pixel interpolation techniques and/or pixel decimation techniques.

When prediction processing unit 82 generates the wedgelet partition pattern greater than 32×32 in size based on a N×N wedgelet pattern, prediction processing unit 82 selects N×N wedgelet partition pattern from the N×N wedgelet pattern list of current 3D-HEVC that was signaled by video encoder 20. Prediction processing unit 82 selects the N×N wedgelet partition pattern using a wedgelet index value of the corresponding N×N partition pattern. Video decoder 30 may upsample the N×N partition pattern to derive the wedgelet partition pattern greater than 32×32 in size. In some examples, the wedgelet index value may be binarized by prediction processing unit 82 using fixed-length code as the same as current 3D-HEVC.

In some examples, prediction processing unit 82 may select the Wedgelet partition pattern greater than 32×32 in size from only the horizontal and/or vertical Wedgelet partition patterns greater than 32×32 in size. As described in FIG. 7, horizontal and vertical partitions may have as start and end points either the same horizontal coordinate or the same vertical coordinate. For instance, a horizontal partition may have a start point that is the same y coordinate value as the end point. A vertical partition may have a start point that is the same x coordinate value as the end point. Accordingly, in some examples, prediction processing unit 82, when generating one or more partitions of the PU greater than 32×32 in size may use only horizontal and/or vertical Wedgelet partition patterns greater than 32×32 in size. For instance, prediction processing unit 82 may not use or otherwise store partition patterns that have different coordinate values in the both x and y dimensions as starting and ending points. In other words, for at least one dimension (e.g., x or y) the coordinate values must be the same for starting and ending points. By using only horizontal and/or vertical partition patterns greater than 32×32 in size, prediction processing unit 82 may reduce the overall number of partition patterns that video decoder 30 must process and/or store. In some examples, the start/end point accuracy for the horizontal/vertical partition pattern greater than 32×32 in size can be full-sample, two-sample, three-sample or four-sample. In some examples, the Wedgelet pattern greater than 32×32 in size is binarized by prediction processing unit 82 using fixed-length code with $\log_2$ [C] bits, where C indicates the total number of Wedgelet patterns greater than 32×32 in size.

In some examples, in addition to prediction processing unit 82 using DMM mode 1 for PU greater than 32×32 in size as described with respect to FIG. 10, prediction processing unit 82 may apply SDC, and therefore each partition of the PU greater than 32×32 in size may have just one DC residual value. Instead of coding quantized transform coefficients, SDC modes represent a depth block with the following two types of information: (1) the type of partition of the current depth block, including DMM mode 1 (2 partitions) and Planar (1 partition), and (2) for each partition, a residual value (in the pixel domain) that is signaled in the bitstream. Therefore, prediction processing unit 82 may determine the type of partition pattern for the PU greater than 32×32 in size and a single residual value, signaled by video encoder 20, for each partition of the PU greater than 32×32 in size. In some examples, prediction processing unit 82 may apply a Wedgelet greater than 32×32 in size for only SDC, meaning each Wedgelet partition of the block greater than 32×32 in size is only reconstructed with SDC. In other examples, prediction processing unit 82 may apply a Wedgelet greater than 32×32 in size only with DMM 1, and not with SDC. In still other examples, prediction processing unit 82 may apply a Wedgelet greater than 32×32 in size to partitions greater than 32×32 in size with both SDC on and off. In other words, prediction processing unit 82 may applying a Wedgelet greater than 32×32 in size to PUs greater than 32×32 in size (1) with DMM 1 and using SDC and (2) with DMM 1 without using SDC. When using SDC, a single residual value for each partition may provide better coding efficiency than determining and signaling residual data for each value in the depth map.

The following description provides an example of the syntax elements and semantics changes to be made to perform some aspects of the techniques described in this disclosure. The changes are presented relative to of the pertinent content of JCT3V-F0126, with updates to the latest WD text of 3D-HEVC as cited above. The syntax may be modified relative to, e.g., that of 3D-HEVC as modified by documents JCT3V-F0126 noted above. In the example description, syntax tables and semantics below, additions to 3D-HEVC (as modified by documents JCT3V-F0126) are represented using italics and deletions are represented using bracketed text preceded by "removed" (e.g., [removed: "removed text"]). In general, statements regarding "requirements" should be understood to form part of the text of the standard or standard extension, and not a requirement for purposes of the techniques of this disclosure.

Syntax Tables

H.7.3.8.5 Coding Unit Syntax

| | Descriptor |
|---|---|
| depth_mode_parameters( x0 , y0 , log2CbSize ) { | |
|   [removed: if ( log2CbSize < 6 )] | |
|   hevc_intra_flag[ x0 ][ y0 ] | ae(v) |
|   if( PartMode[ xC ][ yC ] = = PART_2Nx2N ) | |
|     sdc_flag[ x0 ][ y0 ] | ae(v) |
|   if ( !hevc_intra_flag[ x0 ][ y0 ] ) { | |
|     depth_intra_mode[ x0 ][ y0 ] | ae(v) |
|     if ( DepthIntraMode[ x0 ][ y0 ] = = INTRA_DEP_DMM_WFULL ) | |
|       wedge_full_tab_idx[ x0 ][ y0 ] | ae(v) |
|   } | |
|   if (!sdc_flag[ x0 ][ y0 ] ) { | |
|     if ( DmmFlag[ x0 ][ y0 ] ) { | |
|       dmm_dc_flag[ x0 ][ y0 ] | ae(v) |
|       if ( dmm_dc_flag[ x0 ][ y0 ] ) | |
|         for( i = 0; i < 2; i ++ ) { | |
|           dmm_dc_abs[ x0 ][ y0 ][ i ] | ae(v) |
|           if ( dmm_dc_abs[ x0 ][ y0 ][ i ]) | |
|             dmm_dc_sign_flag[ x0 ][ y0 ][ i ] | ae(v) |
|         } | |
|     } | |
|     else if( DepthIntraMode[ x0 ][ y0 ] = = INTRA_DEP_CHAIN ) { | |
|       edge_dc_flag[ x0 ][ y0 ] | ae(v) |
|       if( edge_dc_flag[ x0 ][ y0 ] ) { | |
|         for( i = 0; i < 2; i++ ) { | |
|           edge_dc_abs[ x0 ][ y0 ][ i ] | ae(v) |
|           if( edge_dc_abs[ x0 ][ y0 ][ i ] != 0 ) | |
|             edge_dc_sign_flag[ x0 ][ y0 ][ i ] | ae(v) |
|         } | |
|       } | |
|     } | |
|   } | |
|   else [removed: if( SdcFlag[ x0 ][ y0 ] )] { | |
|     sdcNumSegments = | |
|     ( [removed: DepthIntraMode[ x0 ][ y0 ] = = INTRA_DEP_SDC_DMM_WFULL ]!hevc_intra_flag[ x0 ][ y0 ] ) ? 2 : 1 | |

| | Descriptor |
|---|---|
|     for( i = 0; i < sdcNumSegments; i++ ) { | |
|       sdc_residual_flag[ x0 ][ y0 ][ i ] | ae(v) |
|       if( sdc_residual_flag[ x0 ][ y0 ][ i ]) { | |
|         sdc_residual_sign_flag[ x0 ][ y0 ][ i ] | ae(v) |
|         sdc_residual_abs_minus1[ x0 ][ y0 ][ i ] | ae(v) |
|       } | |
|     } | |
|   } | |
| } | |

H.9.3.3 Binarization Process
H.9.3.3.1 General
The specifications in subclause 9.3.3.1 apply with the following modifications.
Table H-20 is appended to the end of Table 9-32.

TABLE H-21

| Values of wedgeFullTabIdxBits[log2PUSize] | | | | | |
|---|---|---|---|---|---|
| Initialization variable | | wedgeFullTabIdxBits | | | |
| log2PbSize | 2 | 3 | 4 | 5 | 6 |
| Value | 7 | 10 | 11 | 11 | [removed: 13] 11 |

Decoding Processes
DMM Mode 4 Supporting 64×64 PU
H.8.4.4.2.8 Specification of Intra Prediction Mode INTRA_DMM_CPREDTEX
Inputs to this process are:
  a sample location (xTb, yTb) specifying the top-left sample of the current block relative to the top-left sample of the current picture,
  the neighbouring samples p[x][y], with x=−1, y=−1 . . . nTbS*2−1 and x=0 . . . nTbS*2−1, y=−1,
  a variable nTbS specifying the transform block size,
Output of this process is:
  the predicted samples predSamples[x][y], with x, y=0 . . . nTbS−1.
The values of the prediction samples predSamples[x][y], with x, y=0 . . . nTbS−1, are derived as specified by the following ordered steps:
  1. The variable recTextPic is set equal to the array of the reconstructed luma picture samples of TexturePic.
  2. The variable stepText is set equal to nTbS>32?1:0.
  3. The variable textThresh specifying a threshold for the segmentation of recTextPic is derived as specified in the following.
    The variable sumTextPicVals is set equal to 0.
    For x=0 . . . nTbS−1, x=x+stepText+1 the following applies
      For y=0 . . . nTbS−1, y=y+stepText+1 the following applies
(H-45) sumTextPicVals+=recTextPic[xTh+x][yTh+y]
    The variable textThresh is set equal to (sumTextPicVals>>(2*(log 2(nTbS)−stepText)))
  4. The variable wedgeletPattern[x][y] with x, y=−0 . . . nTbS−1 specifying a binary partition pattern is derived as specified in the following.
    For x=0 . . . nTbS−1 the following applies
      For y=0 . . . nTbS−1 the following applies
        wedgeletPattern[x][y]=(recTextPic[(xTb>>stepText)+x][(yTb>>stepText)+y]>textThresh)
  5. The depth partition value derivation and assignment process as specified in subclause H.8.4.4.2.9 is invoked with the neighbouring samples p[x][y], the binary pattern wedgeletPattern[x][y], the transform size nT, the dcOffsetAvailFlag set equal to depth_dc_flag[xTb]

[yTb], and the DC Offsets DcOffset[xTb][yTb][0], and DcOffset[xTb][yTb][1] as inputs and the output is assigned to predSamples[x][y].

The techniques described in this disclosure may be performed by video encoder 20 and/or video decoder 30, both of which may be generally referred to as a video coder. In addition, video coding may generally refer to video encoding and/or video decoding, as applicable.

Video decoder 30 is an example of a device configured to perform a depth data decoding method that comprises defining a 64×64 depth prediction unit (PU) within a depth coding unit (CU), generating one or more partitions of the 64×64 PU, obtaining residual data for each of the partitions, obtaining prediction data for each of the partitions, and reconstructing each of the partitions based on the residual data and the prediction data for the respective partitions. Defining the 64×64 PU may comprise defining the 64×64 PU using a wedgelet partition pattern (e.g., DMM mode 1) to produce a 64×64 wedgelet partition pattern.

The method performed by decoder 30 may further comprise selecting the wedgelet pattern from a wedgelet pattern list of pre-defined 64×64 wedgelet patterns. Decoder 30 may receive information for selection of the wedgelet pattern from the wedgelet pattern list for the PU in an encoded video bitstream. The method may further comprise constructing the wedgelet pattern list based on connecting all possible start and end positions with a specified start/end point resolution of half-sample, full-sample, two samples, three samples or four samples.

In some examples, video decoder 30 may receive the residual data for each of the partitions in an encoded video bitstream. The 64×64 wedgelet partition pattern may be generated by decoder 30 as an upsampled N×N partition pattern, where N=4, 8, 16 or 32, and the N×N partition pattern is derived in the same way as the 3D-HEVC WD, and the 64×64 partition pattern is signaled in the same way as the N×N partition pattern. As another example, the 64×64 wedgelet partition pattern may be generated by the encoder 20 and received by the decoder 30 in signaling using a wedgelet extension method as described in provisional patent application No. 61/891,203, filed Oct. 15, 2013, i.e., the 64×64 partition pattern is generated by extending a 4×4 wedgelet pattern at a given position. In some examples, the 64×64 wedgelet partition pattern may be selected by video decoder 30 from only the horizontal/vertical 64×64 wedgelet partition patterns, i.e., the start and end points have either the same horizontal coordinate or the same vertical coordinate.

In some examples, the residual data for every partition includes a single DC residual value generated for each partition using segment-wise DC coding (SDC). As another example, the residual data for at least some of the partitions includes a single DC residual value generated for the respective partition using segment-wise DC coding (SDC). Alternatively, the residual data for the partitions is not coded with SDC.

As another example, defining the 64×64 PU by video decoder 30 may comprise defining the 64×64 PU using a DMM mode 4 partition pattern to produce a 64×64 partition pattern. For the 64×64 PU, the average value of all the samples in the 64×64 texture block may be calculated, and then the 64×64 partition pattern may be derived for the PU according to whether the samples in the 64×64 texture block co-located with the depth PU is larger (partition 1) or not larger (partition 0) than the average value.

As another example, for the 64×64 PU, the average value of all the samples in a downsampled N×N block of the 64×64 texture block co-located with the depth PU may be calculated, and then the 64×64 partition pattern for the depth PU may be derived according to whether the samples in the N×N block is larger (partition 1) or not larger (partition 0) than the average value, where N can equals to 4, 8, 16 or 32.

In some examples, video decoder 30 may receive the residual data for each of the partitions in an encoded video bitstream. As one example, residual data for every partition includes a single DC residual value generated for each partition using segment-wise DC coding (SDC). Alternatively, the residual data for at least some of the partitions includes a single DC residual value generated for the respective partition using segment-wise DC coding (SDC). As a further alternative, the residual data for the DMM 4 partitions is not coded with SDC.

As another example, when the 64×64 wedgelet partition pattern is generated with a 32×32 wedgelet pattern, an upsampled 32×32 wedgelet partition pattern is selected from the 32×32 wedgelet pattern list specified by the 3D-HEVC WD, and the 64×64 wedgelet partition pattern is signaled in the bitstream using the wedgelet index value of the corresponding 32×32 partition pattern which is upsampled to derive the 64×64 wedgelet partition pattern, and the wedgelet index value is binarized using fixed-length code as the same as in the 3D-HEVC WD.

For example purposes, techniques of the disclosure have been described with respect to a 64×64 depth PU as an example of a depth PU greater than 32×32. However, techniques of the disclosure may be applied to PU sizes greater than 32×32, such as 64×64, 128×128, etc. In this way, techniques of the disclosure may provide one or more improvements to video coding for a depth PU greater than 32×32.

While the techniques of this disclosure are generally described with respect to 3D-HEVC, the techniques are not limited in this way. The techniques described above may also be applicable to other current standards or future standards for 3D video coding. For example, the techniques for depth coding may also be applicable to other current or future standards involving coding of a depth component, e.g., for 3D video coding or other applications.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium and packaging materials.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), micro-controller, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding depth data in a video coding process, the method comprising:
   defining a depth prediction unit (PU) of a size greater than 32×32 within a depth coding unit (CU);
   generating one or more partitions of the depth PU, wherein generating the one or more partitions of the depth PU comprises:
   upsampling an N×N partition pattern where N is 32 or less;
   storing a pattern list comprising a plurality of different, partition patterns, wherein each respective partition pattern is identified by a respective one of a plurality of partition pattern indexes;
   selecting, based on one of the partition pattern indexes, a partition pattern from the pattern list; and
   applying the selected partition pattern to the depth PU to generate the one or more partitions;
   obtaining residual data for each of the partitions;
   obtaining prediction data for each of the partitions; and
   reconstructing each of the partitions based on the residual data and the prediction data for the respective partitions.

2. The method of claim 1, wherein the depth PU is of size 64×64.

3. The method of claim 1, wherein the plurality of different, partition patterns includes at least one Wedgelet partition pattern, wherein storing the pattern list comprising the plurality of partition patterns further comprises:
   determining the plurality of different, partition patterns based on at least two different start locations and at least two different end locations of the depth PU;
   associating each respective partition pattern of the plurality of different, partition patterns with a respective index value; and
   storing, in the pattern list, a respective association between each respective partition pattern and corresponding, respective index value.

4. The method of claim 3, wherein determining the plurality of different, partition patterns based on the at least two different start locations and the at least two different end locations of the depth PU further comprises:
   connecting at least one of the two different start locations and at least one of the two different end locations using a resolution of half-sample, full-sample, two samples, three samples or four samples.

5. The method of claim 1, wherein generating one or more partitions of the depth PU further comprises:
   receiving information identifying a sub-PU within the depth PU, wherein a size of the sub-PU is less than a size of the depth PU;
   extending a linear line of the partition pattern for the sub-PU to boundaries of the depth PU, wherein a resulting linear line defines the partition pattern for the depth PU; and
   determining the one or more partitions based on the partition pattern.

6. The method of claim 1, wherein generating one or more partitions of the depth PU further comprises:
   generating one or more partitions of the depth PU based only on at least one of a horizontal partition pattern or a vertical partition pattern.

7. The method of claim 1, wherein the residual data for at least one of the partitions includes a single DC residual value generated for the at least one of the partitions using segment-wise DC coding (SDC).

8. The method of claim 1, wherein generating one or more partitions of the depth PU further comprises:
determining an average value of samples in a texture block, the texture block included at a first region of a texture picture, and the first region being co-located with a second region of the depth PU included in a depth map; and
determining for each depth value of the depth map, based on comparing a respective sample of the texture block to the average value of samples, a partition of the one or more partitions to assign the depth value; and
assigning the depth value to the partition of the one or more partitions.

9. The method of claim 8, wherein assigning the depth value to the partition of the one or more partitions further comprises:
determining a first location of the respective depth value within the depth map;
determining a second location of the respective sample in the texture block, wherein the first location in the depth PU is co-located with the second location in the texture block; and
responsive to determining that the respective sample is greater than the average value of samples, assigning the depth value of the first location to a first partition of the one or more partitions.

10. A device for decoding video data comprising:
a video data memory that stores a plurality of different, partition patterns; and
one or more processors configured to:
define a depth prediction unit (PU) of a size greater than 32×32 within a depth coding unit (CU);
generate one or more partitions of the depth PU, wherein to generate the one or more partitions of the depth PU the one or more processors are configured to:
upsample an N×N partition pattern where N is 32 or less;
store a pattern list comprising the different, partition patterns, wherein each respective partition pattern is identified by a respective one of a plurality of partition pattern indexes;
select, based on one of the partition pattern indexes, a partition pattern from the pattern list; and
apply the selected partition pattern to the depth PU to generate the one or more partitions;
determine residual data for each of the partitions;
determine prediction data for each of the partitions; and
reconstruct each of the partitions based on the residual data and the prediction data for the respective partitions.

11. The device for decoding video data of claim 10, wherein the one or more processors are configured to:
determine the plurality of different, partition patterns based on at least two different start locations and at least two different end locations of the depth PU;
associate each respective partition pattern of the plurality of different, partition patterns with a respective index value; and
store, in the pattern list, a respective association between each respective partition pattern and corresponding, respective index value.

12. The device for decoding video data of claim 10, wherein the one or more processors are configured to:
determine an average value of samples in a texture block, the texture block included at a first region of a texture picture, and the first region being co-located with a second region of the depth PU included in a depth map; and
determine for each depth value of the depth map, based on comparing a respective sample of the texture block to the average value of samples, a partition of the one or more partitions to assign the depth value; and
assign the depth value to the partition of the one or more partitions.

13. The device for coding decoding video data of claim 12,
wherein the one or more processors are configured to:
determine a first location of the respective depth value within the depth map;
determine a second location of the respective sample in the texture block, wherein the first location in the depth PU is co-located with the second location in the texture block; and
responsive to determining that the respective sample is greater than the average value of samples, assign the depth value of the first location to a first partition of the one or more partitions.

14. The device for decoding video data of claim 10,
wherein the one or more processors are configured to:
determine an average value of samples in a texture block, the texture block included at a first region of a texture picture, and the first region being co-located with a second region of the depth PU included in a depth map; and
determine for each depth value of the depth map, based on comparing a respective sample of the texture block to the average value of samples, a partition of the one or more partitions to assign the depth value; and
assign the depth value to the partition of the one or more partitions.

15. The device for decoding video data of claim 14,
wherein the one or more processors are configured to:
determine a first location of the respective depth value within the depth map;
determine a second location of the respective sample in the texture block, wherein the first location in the depth PU is co-located with the second location in the texture block; and
responsive to determining that the respective sample is greater than the average value of samples, assign the depth value of the first location to a first partition of the one or more partitions.

16. The device of claim 10, wherein the device is selected from the group consisting of:
an integrated circuit (IC);
a micro-controller; and
a wireless device.

17. The device of claim 10, wherein the device comprises a wireless communication device, the device further comprising a receiver configured to receive encoded video data comprising the plurality of different, partition patterns.

18. A non-transitory computer-readable storage medium having stored thereon instructions that, when executed, cause one or more processors of a device for coding video data to:
define a depth prediction unit (PU) of a size greater than 32×32 within a depth coding unit (CU);

generate one or more partitions of the depth PU, wherein to generate the one or more partitions of the depth PU, the non-transitory computer-readable storage medium stores instructions that cause the one or more processors to:
upsample an N×N partition pattern where N is 32 or less;
store a pattern list comprising a plurality of different, partition patterns, wherein each respective partition pattern is identified by a respective one of a plurality of partition pattern indexes;
select, based on one of the partition pattern indexes, a partition pattern from the pattern list; and
apply the selected partition pattern to the depth PU to generate the one or more partitions;
determine residual data for each of the partitions;
determine prediction data for each of the partitions; and
reconstruct each of the partitions based on the residual data and the prediction data for the respective partitions.

19. The non-transitory computer-readable storage medium of claim 18 having stored thereon instructions that, when executed, cause the one or more processors of the device for coding video data to:
determine the plurality of different, partition patterns based on at least two different start locations and at least two different end locations of the depth PU;
associate each respective partition pattern of the plurality of different, partition patterns with a respective index value; and
store, in the pattern list, a respective association between each respective partition pattern and corresponding, respective index value.

20. The non-transitory computer-readable storage medium of claim 18 having stored thereon instructions that, when executed, cause the one or more processors of the device for coding video data to:
determine an average value of samples in a texture block, the texture block included at a first region of a texture picture, and the first region being co-located with a second region of the depth PU included in a depth map; and
determine for each depth value of the depth map, based on comparing a respective sample of the texture block to the average value of samples, a partition of the one or more partitions to assign the depth value; and
assign the depth value to the partition of the one or more partitions.

21. A device for decoding video data comprising:
a video data memory that stores one or more partition patterns; and
one or more processors configured to:
define a depth prediction unit (PU) of a size greater than 32×32 within a depth coding unit (CU);
generate one or more partitions of the depth PU, wherein to generate the one or more partitions of the depth PU, the one or more processors are configured to:
upsample an N×N partition pattern where N is 32 or less;
determine an average value of samples in a texture block, the texture block included at a first region of a texture picture, and the first region being co-located with a second region of the depth PU included in a depth map; and
determine for each depth value of the depth map, based on comparing a respective sample of the texture block to the average value of samples, a partition of the one or more partitions to assign the respective depth value; and
assign the respective depth value to the determined partition of the one or more partitions, wherein to assign the respective depth value to the determined partition of the one or more partitions further, the one or more processors are configured to:
determine a first location of the respective depth value within the depth map;
determine a second location of the respective sample in the texture block, wherein the first location in the depth PU is co-located with the second location in the texture block; and
responsive to determining that the respective sample is greater than the average value of samples, assign the respective depth value of the first location to a first partition of the one or more partitions;
obtain residual data for each of the partitions;
obtain prediction data for each of the partitions; and
reconstruct each of the partitions based on the residual data and the prediction data for the respective partitions.

22. The device of claim 21, wherein the depth PU is of size 64×64.

23. The device of claim 21, wherein the residual data for at least one of the partitions includes a single DC residual value generated for the at least one of the partitions using segment-wise DC coding (SDC).

24. The device of claim 21, wherein the device is selected from the group consisting of:
an integrated circuit (IC);
a micro-controller; and
a wireless device.

25. The method of claim 1, further comprising:
receiving encoded video data comprising the depth data at a receiver of a wireless communication device;
storing the encoded video data in a memory of the wireless communication device;
processing the encoded video data on one or more processors of the wireless communication device; and
outputting the processed encoded video data.

26. The method of claim 25, wherein the wireless communication device comprises a telephone handset and wherein receiving the encoded video data at the receiver of the wireless communication device comprises demodulating, according to a wireless communication standard, a signal comprising the encoded video data.

27. The device of claim 17, wherein the wireless communication device comprises a telephone handset and wherein the receiver is configured to demodulate, according to a wireless communication standard, a signal comprising the encoded video data.

* * * * *